United States Patent
Kang et al.

(10) Patent No.: US 9,619,083 B1
(45) Date of Patent: Apr. 11, 2017

(54) TOUCH CIRCUIT, TOUCH DISPLAY DRIVER CIRCUIT, TOUCH DISPLAY DEVICE, AND METHOD OF DRIVING THE SAME

(71) Applicant: LG Display Co., Ltd., Seoul (KR)

(72) Inventors: Seongkyu Kang, Paju-si (KR); SungChul Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/957,574

(22) Filed: Dec. 2, 2015

(30) Foreign Application Priority Data

Oct. 12, 2015 (KR) ........................ 10-2015-0142035

(51) Int. Cl.
G06F 3/044 (2006.01)
G06F 3/041 (2006.01)
G09G 5/00 (2006.01)

(52) U.S. Cl.
CPC ............ *G06F 3/0418* (2013.01); *G06F 3/044* (2013.01); *G06F 3/0412* (2013.01); *G09G 5/006* (2013.01); *G09G 2300/0413* (2013.01); *G09G 2310/0245* (2013.01); *G09G 2310/0275* (2013.01); *G09G 2310/0297* (2013.01); *G09G 2310/08* (2013.01)

(58) Field of Classification Search
CPC ...... G06F 3/0418; G06F 3/0412; G06F 3/044; G06F 2203/04107; G09G 5/006
See application file for complete search history.

(56) References Cited

U.S. PATENT DOCUMENTS

| 9,007,343 B1* | 4/2015 | Ludden ................... G06F 3/044 345/173 |
| 2013/0342478 A1* | 12/2013 | Bae ........................ G06F 3/041 345/173 |
| 2014/0267132 A1* | 9/2014 | Rabii .................... G06F 3/0418 345/174 |
| 2015/0002421 A1 | 1/2015 | Kim et al. |

FOREIGN PATENT DOCUMENTS

| EP | 2463756 A1 | 6/2012 |
| EP | 2741182 A1 | 6/2014 |

OTHER PUBLICATIONS

European Extended Search Report, European Application No. 15201494.0, Apr. 14, 2016, 7 pages.

* cited by examiner

*Primary Examiner* — Jennifer Mehmood
*Assistant Examiner* — Sardis F Azongha
(74) *Attorney, Agent, or Firm* — Fenwick & West LLP

(57) ABSTRACT

A touch circuit, a display driver circuit, a touch display device, and a method of driving the same. After display driving is ended and before touch driving begins to be performed, touch driving and touch sensing are accurately performed through pre-setting driving without the influence of display driving that was ended already. An accurate touch sensing result without touch sensing noise is obtained.

28 Claims, 26 Drawing Sheets

TOUCH CIRCUIT, TOUCH DISPLAY DRIVER CIRCUIT, TOUCH DISPLAY DEVICE, AND METHOD OF DRIVING THE SAME

CROSS REFERENCE TO RELATED APPLICATION

This application claims priority from and the benefit under U.S.C. §119(a) from Republic of Korea Patent Application Number 10-2015-0142035 filed on Oct. 12, 2015, which is hereby incorporated by reference for all purposes as if fully set forth herein.

BACKGROUND

Field

The present disclosure relates to a touch circuit, a display driver circuit, a touch display device, and a method of driving the same.

Description of Related Art

In response to the development of the information society, there is increasing demand for various types of display devices able to display images. Currently, a range of display devices, such as liquid crystal display (LCD) devices, plasma display panels (PDPs) and organic light-emitting diode (OLED) display devices, are in common use.

Many display devices provide a touch-based input system enabling users to intuitively and conveniently input data or instructions directly to a device, rather than using conventional input systems, such as buttons, a keyboard, or a mouse.

In order to provide such a touch-based input system, sensitivity to the touch of a user and the ability to accurately detect the coordinates of a touch point are required.

In this regard, capacitive touch sensing technology is commonly used, in which a plurality of touch electrodes (e.g. row electrodes and column electrodes) are disposed on a touchscreen panel (TSP) to detect a touch and the coordinates of a touch point based on changes in capacitance between touch electrodes or changes in capacitance between a touch electrode and a pointer, such as a finger.

However, during touch driving and touch sensing, undesirable parasitic capacitance may be generated in addition to capacitance required for touch sensing.

According to capacitive touch sensing technology, such undesirable parasitic capacitance may be problematic, for example, increasing the load of a touch operation, decreasing the accuracy of touch sensing, and in severe cases, rendering touch sensing impossible.

When a display mode and a touch mode are undertaken by being time-divided, an incorrect touch sensing result may be caused by factors other than parasitic capacitance.

The above-described problems become exacerbated in display devices in which a touchscreen panel (TSP) is disposed within a display panel.

BRIEF SUMMARY

Various aspects of the present disclosure provide a touch circuit, a display driver circuit, a touch display device, and a method of driving the same able to improve the accuracy of touch sensing by stabilizing touch sensing when display driving is ended and touch driving begins to be performed.

Also provided are a touch circuit, a display driver circuit, a touch display device, and a method of driving the same able to minimize or remove the influence between a display mode and a touch mode when the display mode and the touch mode are undertaken by being time-divided, such that a display function and a touch sensing function can be properly performed.

Also provided are a touch circuit, a display driver circuit, a touch display device, and a method of driving the same able to accurately perform touch driving and touch sensing without the influence of ended display driving when display driving is ended and touch driving begins to be performed, thereby providing an accurate touch sensing result.

Also provided are a touch circuit, a display driver circuit, a touch display device, and a method of driving the same able to accurately perform display driving without the influence of ended touch driving when touch driving is ended and display driving begins to be performed, thereby improving image quality.

Also provided are a touch circuit, a display driver circuit, a touch display device, and a method of driving the same able to accurately perform touch driving and load free driving as well as resultant touch sensing without the influence of ended display driving when display driving is ended and both touch driving and load free driving for removing parasitic capacitance begin to be performed.

According to an aspect of the present disclosure, a touch display device includes: a display panel on which N number of common electrodes are disposed, wherein the N number of common electrodes are categorized into M number of common electrode groups, where $2 \leq N \leq N$; and a touch circuit sequentially outputting a touch driving signal to the M number of common electrode groups in order to sequentially drive the M number of common electrode groups during a touch mode.

In this touch display device, the touch circuit may output a pre-setting signal before sequentially driving the M number of common electrode groups.

According to another aspect of the present disclosure, a touch display device includes: a display panel on which N number of common electrodes are disposed; and a touch circuit driving the N number of common electrodes during a touch mode that is performed after a display mode.

In this touch display device, the touch circuit may supply a pre-setting signal to at least one common electrode among the N number of common electrodes before driving the N number of common electrodes during the touch mode.

According to further another aspect of the present disclosure, a method of driving a touch display device includes: a display driving operation of applying a display mode voltage to N number of common electrodes disposed on a display panel in a display mode; and a touch driving operation of sequentially applying a touch driving signal to the N number of common electrodes in a touch mode.

The method may further include a pre-setting operation of applying a pre-setting signal to at least one common electrode among the N number of common electrodes before sequentially applying the touch driving signal to the N number of common electrodes before the touch driving.

According to still another aspect of the present disclosure, a touch circuit includes: a touch driver circuit sequentially outputting a touch driving signal to be applied to each of M number of common electrode groups, where $2 \leq M \leq N$, in order to sequentially drive the M number of common electrode groups into which N number of common electrodes disposed on a display panel are categorized, during a touch mode; a switch circuit sequentially connecting the touch driver circuit to the M number of common electrode groups according to a driving sequence of the M number of common electrode groups; and a touch sensing circuit receiving a touch sensing signal corresponding to each of the M number of common electrode groups to which the touch driving signal is applied through the switch circuit and sensing a touch based on the touch sensing signal corresponding to each of the M number of common electrode groups.

In this touch circuit, the touch driver circuit may output a pre-setting signal to at least one common electrode group among the M number of common electrode groups before sequentially driving the M number of common electrode groups.

According to another aspect of the present disclosure, a touch circuit includes: a touch driving module sequentially outputting a touch driving signal to M number of common electrode groups, where 2≤M≤N, into which N number of common electrodes disposed on a display panel are categorized, during a touch mode; and a touch sensing module sensing a touch based on a touch sensing signal received from each of the M number of common electrode groups.

In this touch circuit, the touch driving module may output a pre-setting signal before sequentially outputting the touch driving signal to the M number of common electrode groups.

According to further another aspect of the present disclosure, a display driver circuit includes: a display driving section outputting a display mode voltage to N number of common electrodes disposed on a display panel during a display mode; and a touch circuit section sequentially outputting a touch driving signal to M number of common electrode groups, where 2≤M≤N, into which N number of common electrodes disposed on a display panel are categorized, during a touch mode.

In this display driver circuit, the touch circuit section may output a pre-setting signal before sequentially outputting the touch driving signal to the M number of common electrode groups.

According to still another aspect of the present disclosure, a display driver circuit includes: a data driver circuit outputting a data voltage to a plurality of data lines disposed on a display panel during a display mode; and a touch sensing signal detection circuit sequentially detecting a touch sensing signal from M number of common electrode groups, where 2≤M≤N, into which N number of common electrodes disposed on the display panel are categorized, during a touch mode.

In the display driver circuit, the touch sensing signal detection circuit may extract a portion of a plurality of pulses of the touch sensing signal.

According to present embodiments, it is possible to provide the touch circuit, the display driver circuit, the touch display device, and the method of driving the same able to improve the accuracy of touch sensing by stabilizing touch sensing when display driving is ended and touch driving begins to be performed.

According to present embodiments, it is possible to provide the touch circuit, the display driver circuit, the touch display device, and the method of driving the same able to minimize or remove the influence between the display mode and the touch mode when the display mode and the touch mode are undertaken by being time-divided, such that the display function and the touch sensing function can be properly performed.

According to the present embodiments, it is possible to provide the touch circuit, the display driver circuit, the touch display device, and the method of driving the same able to accurately perform touch driving and touch sensing without the influence of ended display driving when display driving is ended and touch driving begins to be performed, thereby providing an accurate touch sensing result.

According to the present embodiments, it is possible to provide the touch circuit, the display driver circuit, the touch display device, and the method of driving the same able to accurately perform display driving without the influence of ended touch driving when touch driving is ended and display driving begins to be performed, thereby improving image quality.

According to the present embodiments, it is possible to provide the touch circuit, the display driver circuit, the touch display device, and the method of driving the same able to accurately perform touch driving and load free driving as well as resultant touch sensing without the influence of ended display driving when display driving is ended and both touch driving and load free driving for removing parasitic capacitance begin to be performed.

In one embodiment, a touch sensitive display device comprises a display panel including a plurality of electrodes. The display device also comprises circuitry to drive the electrodes during at least a display mode and a touch mode. During the display mode, the circuitry provides a common voltage to the electrodes. During the touch mode, the circuitry provides a touch driving signal to at least one first electrode of the electrodes. During a pre-setting period after the common voltage is provided to the electrodes and before the touch driving signal is provided to the at least one first electrode, the circuitry provides a pre-setting dummy pulse signal to the at least one first electrode. During the pre-setting period the circuitry disregards touch sensing data generated responsive to the pre-setting dummy pulse signal.

In one embodiment, the touch sensitive display device comprises a timing controller to generate a synchronization signal having a first state during the touch mode and a second state during the display mode. The pre-setting period can be during the touch mode when the synchronization signal is in the first state. Alternatively, the pre-setting period can be during the display mode when the synchronization signal is in the second state.

In one embodiment, during the touch mode, the circuitry provides the touch driving signal to at least one second electrode of the electrodes after providing the touch driving signal to the at least one first electrode. Also during the touch mode, the circuitry does not provide the pre-setting dummy pulse signal to the at least one second electrode.

In one embodiment, the circuitry provides the pre-setting dummy pulse signal to at least one second electrode of the electrodes after providing the touch driving signal to the at least one first electrode. The circuitry also provides the touch driving signal to the at least one second electrode after providing the pre-setting dummy pulse signal to the at least one second electrode.

In one embodiment, the display panel comprises a plurality of data lines and a plurality of gate line. The circuitry provides a pre-setting load free driving (LFD) signal to at least one of the gate lines or data lines while the pre-setting dummy pulse signal is provided to the at least one first electrode. The pre-setting LFD signal also has a same phase as the pre-setting dummy pulse signal.

In one embodiment, during another display mode following the touch mode, the circuitry again provides the common voltage to the electrodes. During a post-setting period after the circuitry provides the touch driving signal to the at least one electrode and before the circuitry again provides the common voltage to the electrodes, the circuitry provides a post-setting signal to the electrodes that is same as the common voltage.

In one embodiment, the pre-setting dummy pulse signal has a same phase as the touch driving signal. The pre-setting dummy pulse signal may have a same amplitude as the touch driving signal or have a greater amplitude than the touch driving signal.

In one embodiment, the touch driving signal comprises one or more reset pulses and one or more real touch driving pulses after the one or more reset pulses. The circuitry does not sense touch from touch sensing data generated responsive to the reset pulses and senses touch from touch sensing data generated responsive to the one or more real touch driving pulses.

In one embodiment, a driver circuit is disclosed that includes the circuitry for driving the electrodes of the display panel. In embodiment, a method of operation in the display panel is disclosed.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
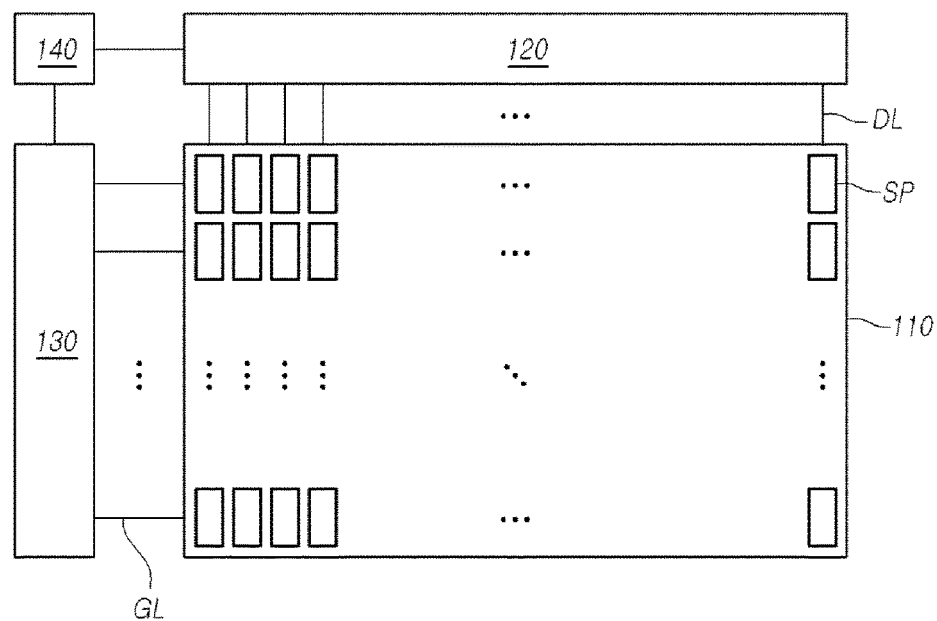
FIG. 1 is a system configuration view illustrating a touch display device according to embodiments of the present disclosure.

Reference will now be made in detail to embodiments of the present disclosure, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)" and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected" or "coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a system configuration view illustrating a touch display device 100 according to embodiments of the present disclosure.

Referring to FIG. 1, the touch display device 100 according to the present embodiments is a device able to provide both an image display function (display function) and a touch sensing function.

Referring to FIG. 1, the touch display device 100 according to the present embodiments includes a display panel 110, a data driver 120, a gate driver 130, a controller 140, and the like in order to provide the display function. On the display panel 110, a plurality of data lines LD and a plurality of gate lines GL are disposed, and a plurality of subpixels SP are arranged. The data driver 120 drives the plurality of data lines LD, and the gate driver 130 drives the plurality of gate lines GL. The controller 140 controls the data driver 120 and the gate driver 130.

The controller 140 controls the data driver 120 and the gate driver 130 by supplying a variety of control signals to the data driver 120 and the gate driver 130.

The controller 140 starts scanning based on timing realized by each frame, outputs converted video data by converting video data input from an external source into a data signal format readable by the data driver 120, and at a suitable point in time, regulates data processing in response to the scanning.

The controller 140 may be a timing controller used in a typical display device or may be an integrated controller including a timing controller and executing other control functions.

The data driver 120 drives the plurality of data lines DL by supplying data voltages thereto. The data driver 120 is also referred to as a "source driver."

The gate driver 130 sequentially drives the plurality of gate lines GL by sequentially supplying a scanning signal thereto. The gate driver 130 is also referred to as a "scanning driver."

The gate driver 130 sequentially supplies the scanning signal having an on or off voltage to the plurality of gate lines GL under the control of the controller 140.

When a specific gate line is opened by the gate driver 130, the data driver 120 converts video data received from the controller into analog data voltages and supplies the analog data voltages to the plurality of data lines DL.

In FIG. 1, the data driver 120 is positioned on one side (the upper side or the lower side) of the display panel 110. However, the data driver 120 may be positioned on both sides (e.g. both the upper side and the lower side) of the display panel 110 depending on the driving system, the design of the panel, or the like.

The gate driver 130 is positioned on one side (the left side or the right side) of the display panel 110 in FIG. 1. However, the gate driver 130 may be positioned on both sides (e.g. both the left side and the right side) of the display panel 110 depending on the driving system, the design of the panel, or the like.

The controller 140 receives a variety of timing signals including a vertical synchronization signal Vsync, a horizontal synchronization signal Hsync, an input data enable (DE) signal, and a clock signal from external sources (e.g. a host system), together with input video data.

The controller 140 not only outputs converted video data by converting video data input from an external source into a data signal format readable by the data driver 120, but also outputs a variety of control signals to the data driver 120 and the gate driver 130 by generating the variety of control signals in response to a variety of received timing signals, including a vertical synchronization signal Vsync, a horizontal synchronization signal Hsync, an input DE signal, and a clock signal, in order to control the data driver 120 and the gate driver 130.

For example, the controller 140 outputs a variety of gate control signals (GCSs) including a gate start pulse (GSP), a gate shift clock (GSC) signal, and a gate output enable (GOE) signal in order to control the gate driver 130.

Here, the GSP controls the operation start timing of the gate driver integrated circuits (ICs) of the gate driver 130. The GSC signal is a clock signal commonly input to the gate driver ICs to control the shift timing of a scanning signal (gate pulse). The GOE signal designates the timing information of the gate driver ICs.

In addition, the controller 140 outputs a variety of data control signals (DCSs) including a source start pulse (SSP), a source sampling clock (SSC) signal, and a source output enable (SOE) signal in order to control the data driver 120.

Here, the SSP controls the data sampling start timing of the source driver ICs of the data driver 120. The SSC signal is a clock signal controlling the data sampling timing of each of the source driver ICs. The SOE signal controls the output timing of the data driver 120.

The above-described data driver 120 may be implemented as one or more source driver ICs.

Each of the source driver ICs may be connected to the bonding pads of the display panel 110 by tape-automated bonding (TAB) or chip-on-glass (COG) bonding, may be directly disposed on the display panel 110, or in some cases, may be integrated with the display panel 110, forming a portion of the organic display panel 110. Alternatively, each of the source driver ICs may be mounted on a film connected to the display panel 110 by a chip-on film (COF) method.

Each of the source driver ICs may include a shift register, a latch circuit, a digital-to-analog converter (DAC), an output buffer, and the like.

In some cases, each of the source driver ICs further includes an analog-to-digital converter (ADC).

The gate driver 130 includes one or more gate driver ICs.

Each of the gate driver ICs may be connected to the bonding pads of the display panel 110 by tape-automated bonding (TAB) or chip-on-glass (COG) bonding, may be implemented as a gate-in-panel (GIP)-type IC directly disposed on the display panel 110, or in some cases, may be integrated with the display panel 110, forming a portion of the display panel 110. Alternatively, each of the gate drivers IC may be mounted on a film connected to the display panel 110 by a chip-on film (COF) method.

Each of the gate drivers IC may include a shift register, a level shifter, and the like.

The touch display device 100 according to the present embodiments may include one or more source printed circuit boards (S-PCBs) required for circuit-connection to the data driver 120 and a control printed circuit boards (C-PCB) on which control components, such as the controller 140, and a variety of electronic devices are mounted.

Each of the S-PCBs may have a source driver IC mounted thereon, or a film on which the source driver IC is mounted may be connected to each S-PCB.

The C-PCB may have the controller 140, a power control circuit (420 in FIG. 4), and the like mounted thereon, in which the controller 140 controls the operations of the data driver 120, the gate driver 130, and the like, and the power control circuit supplies a variety of voltages or currents to or controls the supply of the variety of voltages or currents to the display panel 110, the data driver 120, the gate driver 130, and the like.

The S-PCBs and the C-PCB may be connected by means of at least one connecting member.

The connecting member may be a flexible printed circuit (FPC), a flexible flat cable (FFC), or the like.

The S-PCBs and the C-PCB may be integrated as a single PCB.

In the touch display device 100 according to the present embodiments, the data driving function and the gate driving function can be provided by an integrated driver in which the data driver 120 and the gate driver 130 are unified.

In this case, the touch display device 100 according to the present embodiments may include at least one driver IC providing both the data driving function and the gate driving function.

The touch display device 100 according to the present embodiments may be, for example, a device selected from among various types of devices, such as a liquid crystal display (LCD) device, an organic light-emitting diode (OLED) display device, a plasma display device, and the like.

By the way, the touch display device 100 according to the present embodiments includes a touch system in order to provide the touch function.

Hereinafter, the touch system of the touch display device 100 according to the present embodiments will be described in detail.

Figure 2:
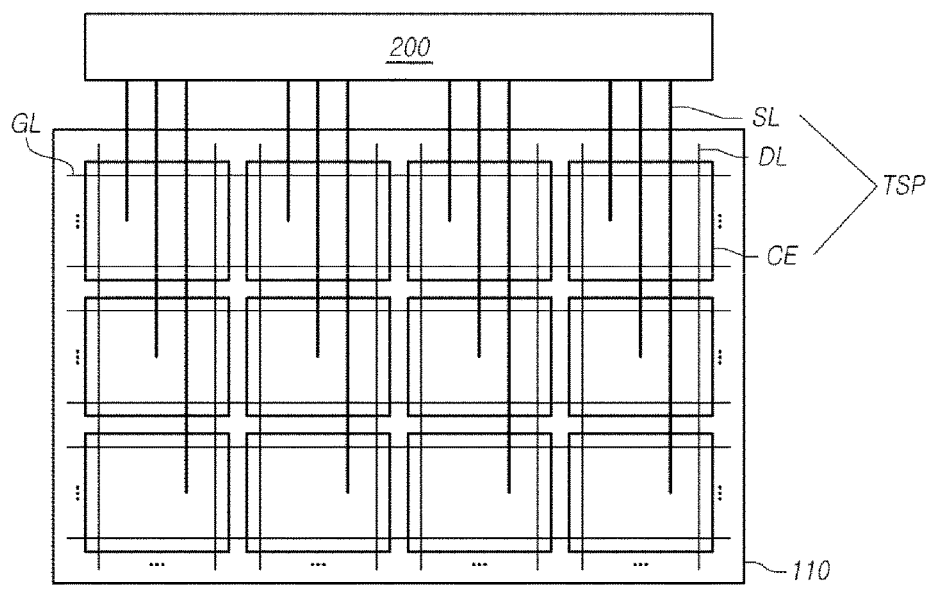
FIG. 2 is a schematic diagram illustrating a touch system of the touch display device according to the present embodiments.

FIG. 2 is a schematic diagram illustrating the touch system of the touch display device 100 according to the present embodiments.

Referring to FIG. 2, the touch system of the touch display device 100 according to the present embodiments includes a plurality of touch electrodes acting as touch sensors, a touch circuit 200 performing touch sensing by driving the plurality of touch electrodes, and the like.

In the touch system of the touch display device 100 according to the present embodiments, the plurality of touch electrodes are disposed on the display panel 110.

That is, in the touch display device 100 according to the present embodiments, the display panel 110 has a touch-screen panel (TSP) disposed therein.

In addition, in the touch display device 100 according to the present embodiments, the plurality of touch electrodes may act not only as the touch sensors, but also as display electrodes associated with the display function.

In this connection, hereinafter, the touch electrodes will be described as common electrodes CE.

Here, the term "common" means that the common electrodes CE are in common use as the display electrodes and the touch electrodes.

When the plurality of common electrodes CE are used as the touch electrodes, a touch driving signal (TDS) is sequentially applied to the plurality of common electrodes CE.

When the plurality of common electrodes CE are used as the display electrodes, a display mode voltage is simultaneously applied to the plurality of common electrodes CE.

When the plurality of common electrodes CE are used as the display electrodes, each of the common electrodes CE may be an electrode corresponding to a pixel electrode present in each subpixel area.

In this case, the display mode voltage applied to the plurality of CEs may be a common voltage Vcom corresponding to a pixel voltage (a data voltage or a voltage corresponding thereto) applied to pixel electrodes.

N number common electrodes CE (N≥2) are disposed on the display panel 110.

Each of the common electrodes CE may have the shape of a block, as illustrated in FIG. 2. This is not intended to be limiting, and the common electrodes may have any shape as long as the common electrodes are separated from each other.

The N number of common electrodes CE disposed within the display panel 110 may be arranged in a matrix, as illustrated in FIG. 2.

The N number of common electrodes disposed on the display panel 110 may be categorized into M number of common electrode groups GE #1, . . . , and GE #M, where 2≤M≤N.

According to this categorization, each of the common electrode groups includes N/M number of common electrodes CE.

The N/M number of common electrodes CE of each common electrode group are simultaneously touch-driven. The simultaneous touch driving of the common electrode group can be interpreted as the N/M number of common electrodes CE of the common electrode group being simultaneously driven.

When the number N of the common electrodes is equal to the number M of the common electrode groups, each of the common electrode groups includes a single common electrode CE. That is, the single common electrode CE forms a common electrode group.

In this case, to drive a common electrode group has the same meaning as to drive a common electrode CE.

Referring to FIG. 2, the touch circuit 200 can provide a touch driving function of sending a touch driving signal to the common electrodes CE and a touch sensing function of detecting a touch or calculating the coordinates of a touch point by receiving a touch sensing signal (TSS) from at least one common electrode among the common electrodes CE to which the touch driving signal is applied.

Regarding the touch driving function, in a time period determined for the touch driving, the touch circuit 200 can sequentially output a touch driving signal to the M number of common electrode groups in order to sequentially drive the M number of common electrode groups.

Regarding the touch sensing function, the touch circuit 200 can receive a TSS from a common electrode CE to which the touch driving signal TDS is applied and subsequently detect a touch or calculate the coordinates of a touch point by sensing capacitance (or a voltage or a charge) or a variation in capacitance (or a change in voltage or a change in charge) in the corresponding common electrode CE.

Here, the touch circuit 200 is electrically connected to the N number of common electrodes CE through N number of sensing lines SL.

The touch circuit 200 receives the TSS by sending the touch driving signal TDS to a single common electrode CE through a single sensing line SL.

Regarding the display function, the data driver 120, a power control circuit, or the other power supply can simultaneously supply display mode voltages to the N number of common electrodes CE through the N number of sensing lines SL.

The above-described touch circuit 200 may be formed of a plurality of functional components or one or more touch ICs in order to provide both the touch driving function and the touch sensing function.

In addition, some portions of the plurality of components of the touch circuit 200 may be formed as a separate circuit and the other portions of the plurality of components of the touch circuit 200 may be situated within the other driving chip.

Hereinafter, as illustrated in FIG. 2, the case that, when N is 12, 12 common electrodes CE are disposed on the display panel 110, in a matrix consisting of 3 rows and 4 columns, will be described for the sake of convenience of explanation.

In addition, for example, 12 and 3 common electrode groups are formed by categorizing the twelve common electrodes CE. That is, the number of the common electrode groups is 12 or 3.

Figure 3:
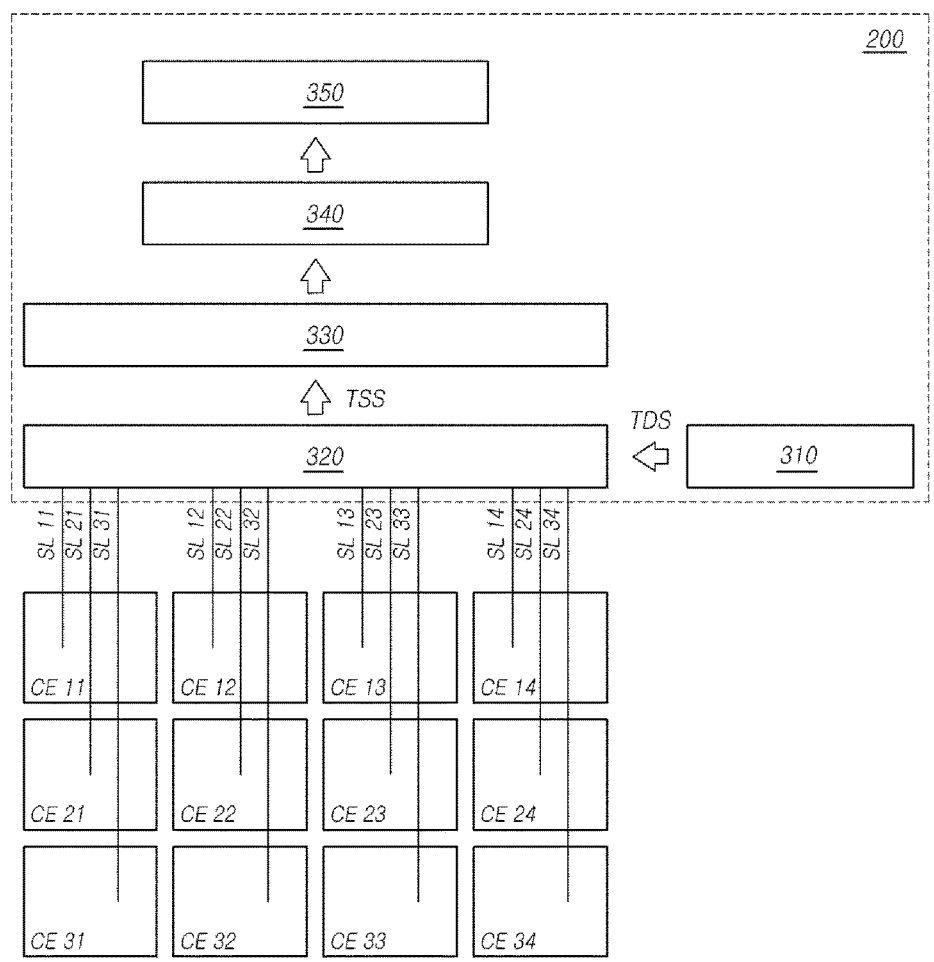
FIG. 3 is a schematic configuration diagram of a touch circuit of the touch system of the touch display device according to the present embodiments.
Figure 4:
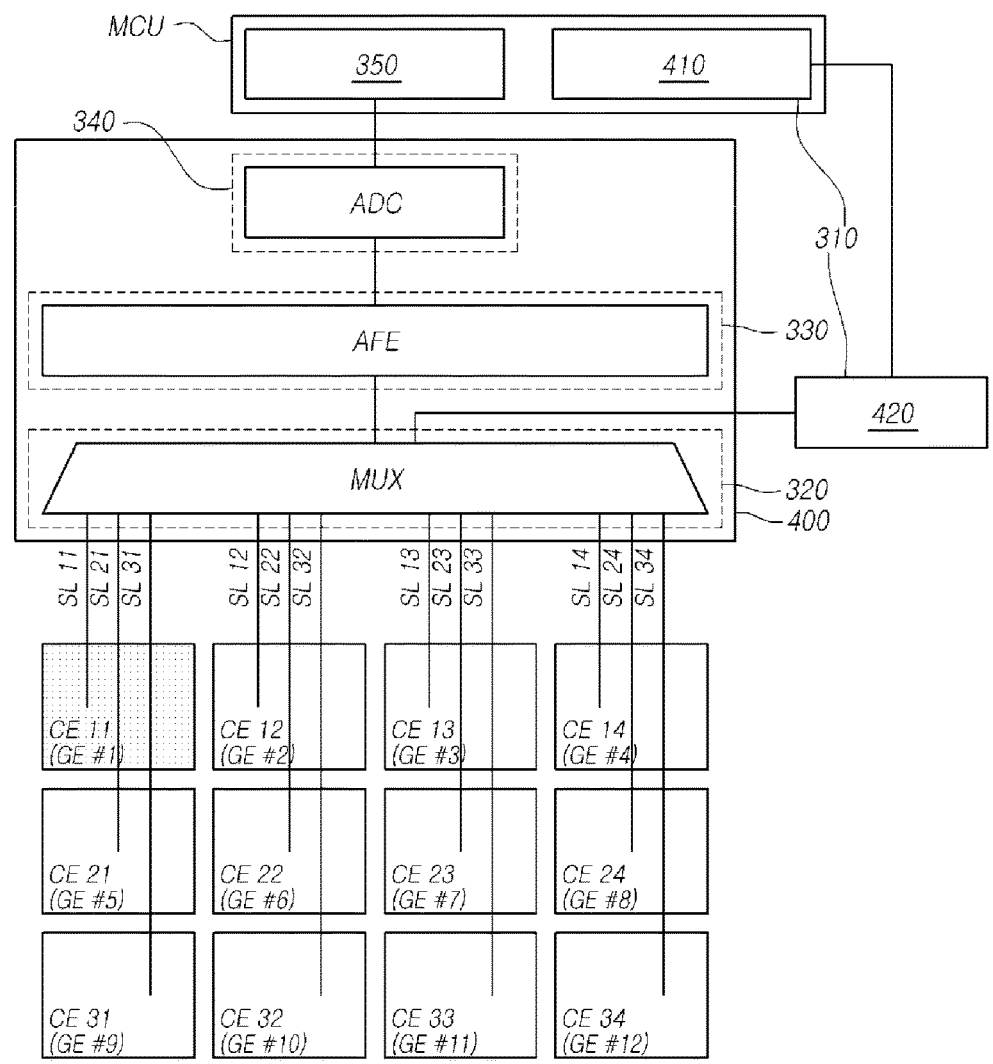
FIG. 4 is a configuration diagram of the touch circuit of the touch system of the touch display device according to the present embodiments when N number of common electrodes are sequentially driven.
Figure 5:
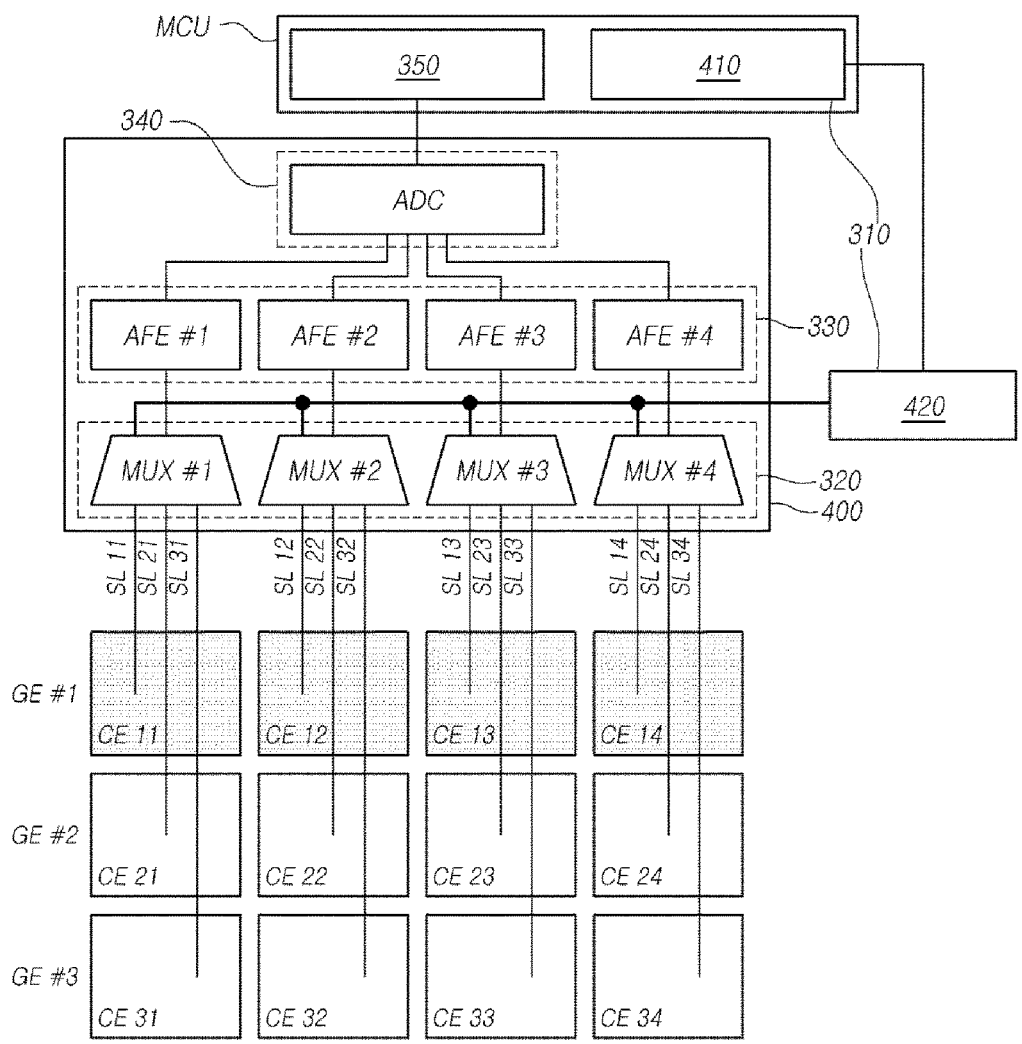
FIG. 5 is a configuration diagram of the touch circuit of the touch system of the touch display device according to the present embodiments when N number of common electrodes categorized into M number of common electrode groups are driven according to the common electrode groups.

FIG. 3 is a schematic configuration diagram of the touch circuit 200 of the touch system of the touch display device 100 according to the present embodiments, FIG. 4 is a configuration diagram of the touch circuit of the touch system of the touch display device 100 according to the present embodiments when N number of common electrodes are sequentially driven, and FIG. 5 is a configuration diagram of the touch circuit of the touch system of the touch display device 100 according to the present embodiments when N number of common electrodes categorized into M number of common electrode groups are driven according to the common electrode groups.

FIG. 4 illustrates an example in which 12 common electrodes CE 11, CE 12, CE 13, CE 14, CE 21, CE 22, CE 23, CE 24, CE 31, CE 32, CE 33, and CE 34 are categorized into 12 common electrode groups GE #1, GE #2, . . . , and GE #12 (M=12). In this case, each of the common electrodes forms a common electrode group.

FIG. 5 illustrates an example in which 12 common electrodes CE 11, CE 12, CE 13, CE 14, CE 21, CE 22, CE 23, CE 24, CE 31, CE 32, CE 33, and CE 34 are categorized into 3 common electrode groups GE #1, GE #2, and GE #3 (M=3).

In this case, each of the common electrode groups includes 4 common electrodes. Specifically, common electrode group GE #1 includes CE 11, CE 12, CE 13, and C14, common electrode group GE #2 includes CE 21, CE 22, CE 23, and C24, and common electrode group GE #3 includes CE 31, CE 32, CE 33, and C34.

The number of common electrodes belonging to a single common electrode group is obtained by dividing the number N of common electrodes by the number M of the common electrode groups.

The number of common electrodes belonging to a single common electrode group is equal to the number of common electrodes that can be simultaneously touch-driven.

Referring to FIG. 3, the touch circuit 200 of the touch system of the touch display device 100 according to the present embodiments includes, for example, a signal providing circuit 310, a switch circuit 320, a touch sensing signal detection circuit 330, a sensing data generator circuit 340, a touch sensing circuit 350, and the like.

The signal providing circuit 310 provides a touch driving signal TDS.

One end of the switch circuit 320 is connected to the signal providing circuit 310, and the other end of the switch circuit 320 is connected to N number of signal lines SL 11, SL 12, SL 13, SL 14, SL 21, SL 22, SL 23, SL 24, SL 31, SL 32, SL 33, and SL 34.

The N number of signal lines SL 11, SL 12, SL 13, SL 14, SL 21, SL 22, SL 23, SL 24, SL 31, SL 32, SL 33, and SL 34 are connected to N number of common electrodes CE 11, CE 12, CE 13, CE 14, CE 21, CE 22, CE 23, CE 24, CE 31, CE 32, CE 33, and CE 34 in a corresponding manner.

The switch circuit 320 sequentially connects one or more common electrodes to the signal providing circuit 310 according to the touch driving sequence of the N number of common electrodes CE 11, CE 12, CE 13, CE 14, CE 21, CE 22, CE 23, CE 24, CE 31, CE 32, CE 33, and CE 34.

Consequently, the touch driving signal TDS provided by the signal providing circuit 310 is sequentially transferred to one or more sensing lines through the switch circuit 320, whereby the touch driving signal TDS is sequentially applied to the one or more common electrodes that are to be touch-driven.

The touch sensing signal detection circuit 330 can detect the touch sensing signal TSS, received from the one or more common electrodes (included in the common electrode group) to which the touch driving signal TDS is applied, by means of the switch circuit 320.

The sensing data generator circuit 340 generates sensing data based on the touch sensing signal detected from each common electrode.

The touch sensing circuit 350 senses a touch based on the sensing data. Here, to sense the touch means to detect a touch or calculate the coordinates of a touch point.

Referring to FIG. 4 and FIG. 5, the signal providing circuit 310 includes, for example, a pulse generator 410 generating a pulse modulation signal (e.g. a pulse width modulation signal) and the power control circuit 420 providing a touch driving signal TDS generated based on the pulse modulation signal.

Referring to FIG. 4 and FIG. 5, the touch sensing signal detection signal 330 includes one or more analog front ends (AFEs).

The touch sensing signal detection signal 330 may include one AFE, as illustrated in FIG. 4, or may include two or more AFEs AFE #1, AFE #2, AFE #3, and AFE #4, as illustrated in FIG. 5.

Referring to FIG. 4 and FIG. 5, the switch circuit 320 includes one or more multiplexers.

Specifically, as illustrated in FIG. 4, when a single AFE is provided, the switch circuit 320 includes a single multiplexer MUX. As illustrated in FIG. 5, when four AFEs AFE #1, AFE #2, AFE #3, and AFE #4 are provided, the switch circuit 320 includes 4 multiplexers MUX #1, MUX #2, MUX #3, and MUX #4.

That is, the number of the multiplexers is equal to the number of the AFEs.

The number of the multiplexers and the number of the AFEs may vary depending on the level to which the common electrodes are grouped.

That is, the number of the multiplexers and the number of the AFEs increase with increases in the level to which the common electrodes are grouped, i.e. decreases in the number M of the common electrode groups.

The embodiment of FIG. 5 indicates that the common electrodes are grouped to a high level, i.e. the number M of the common electrode groups is small. Thus, the number the multiplexers and the number of the AFEs are increased.

Referring to FIG. 4 and FIG. 5, each of the number of the multiplexers and the number of the AFEs is equal to the number of common electrodes belonging to a single common electrode group.

Here, the number of the common electrodes belonging to a single common electrode group is N/M, obtained by dividing the number N of the common electrodes by the number M of the common electrode groups.

Each of the number of the multiplexers and the number of the AFEs is equal to the number of the common electrodes that can be simultaneously touch-driven.

Referring to FIG. 4 and FIG. 5, each of the multiplexers is an M:1 multiplexer considering that a TDS provided by the power control circuit 420 is output through one signal line from among the M number of signal lines or a TSS from one signal line from among the M number of signal lines is transferred to the corresponding AFE.

In the embodiment of FIG. 4 where M=12, a single multiplexer MUX is a 12:1 multiplexer. In the embodiment of FIG. 5 where M=3, each of 4 (=12/3) multiplexers MUX #1, . . . , and MUX #4 is a 3:1 multiplexer.

Referring to FIG. 4 and FIG. 5, the sensing data generator circuit 340 includes an ADC generating sensing data by converting a detected TSS into digital data.

Referring to FIG. 4 and FIG. 5, the touch sensing circuit 350 and the pulse generator 410 may be implemented as separate components, or may be implemented as a single micro-control unit (MCU).

Referring to FIG. 4 and FIG. 5, the switch circuit 320, the touch sensing signal detection circuit 330, and the sensing data generator circuit 340 may be separately formed. As an alternative, at least one of the switch circuit 320, the touch sensing signal detection circuit 330, and the sensing data generator circuit 340 may be included in a display driving chip together with a data driver circuit or may be included within the data driver circuit.

Figure 6:
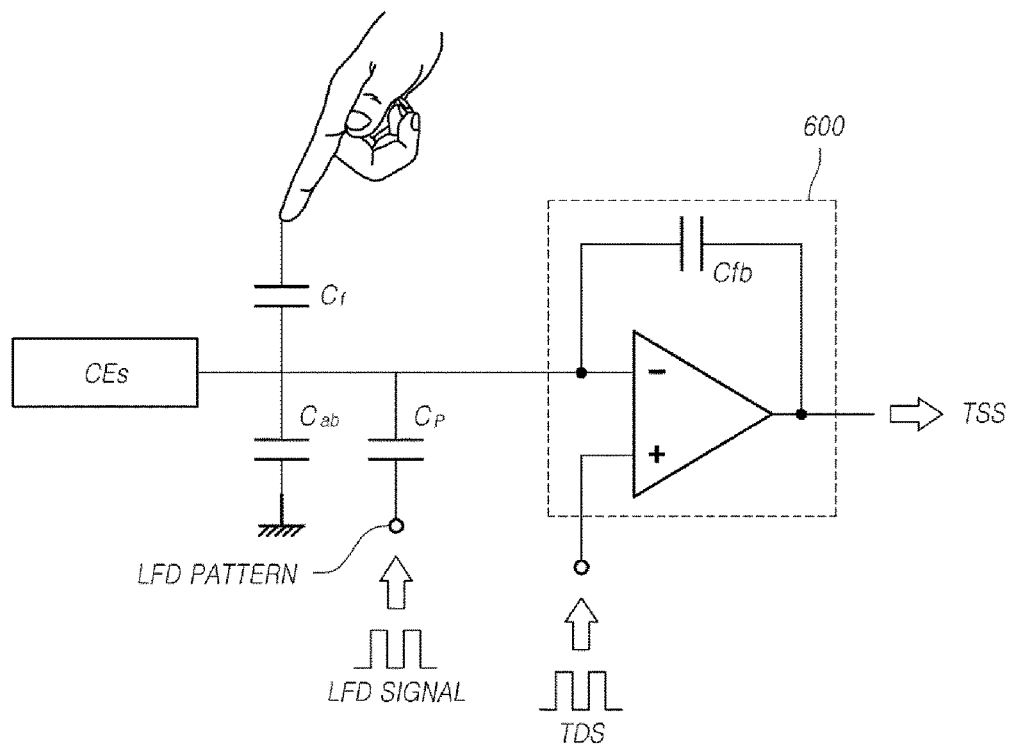
FIG. 6 is an equivalent circuit diagram illustrating the principle of touch driving and touch sensing for the touch system of the touch display device according to the present embodiments.

FIG. 6 is an equivalent circuit diagram illustrating the principle of touch driving and touch sensing for the touch system of the touch display device 100 according to the present embodiments.

Referring to FIG. 6, the touch system performs touch driving and touch sensing by using an integrator 600.

The integrator 600 may include a feedback capacitor Cfb and an amplifier including a positive terminal (+), a negative terminal (−) functioning as an input terminal, and an output terminal.

The integrator 600 may output an integral value with respect to a voltage of a signal input to the input terminal.

A touch driving signal TDS is input to the positive terminal (+) of the amplifier in the integrator 600 and is applied to a common electrode CEs to be touch-driven and touch-sensed, which is electrically connected to the negative terminal (−) of the amplifier.

According to the presence or absence of a touch, that is, the presence or absence of a formation of a capacitor between the common electrode CEs and a pointer such as a finger and a pen, a total capacitance of the amplifier in the integrator 600, connected to the negative terminal (−) (input terminal), is changed, and the change in the total capacitance is output to the output terminal of the amplifier in the integrator 600 as a touch sensing signal TSS.

In the case of the presence of the pointer, the total capacitance of the amplifier in the integrator 600 connected to the negative terminal (−) (input terminal) may be determined by an absolute capacitance Cab of the common electrode CEs and a capacitance Cf between the common electrode CEs and the pointer.

In the case of the absence of the pointer, the total capacitance of the amplifier in the integrator 600 connected to the negative terminal (−) (input terminal) may be determined by the absolute capacitance Cab of the common electrode CEs.

At the time of touch driving, when the touch driving signal TDS is applied to the common electrode CEs to be touch-driven and touch-sensed, parasitic capacitance Cp may be unnecessarily generated between the common electrode CEs and a pattern, such as a data line, a gate line, or other common electrodes CEo, disposed on the display panel 110.

When the parasitic capacitance Cp is generated, the total capacitance may be determined by the absolute capacitance Cab of the common electrode CEs, the capacitance Cf between the common electrode CEs and the pointer, and the parasitic capacitance Cp.

Therefore, as the parasitic capacitance Cp is generated, the total capacitance may be changed, and the touch sensing signal TSS may be changed according to the change in the total capacitance. The change in the touch sensing signal TSS may considerably decrease touch sensing accuracy.

Therefore, when the touch driving signal TDS is applied to the common electrode CEs to be touch-driven and touch-sensed, the touch system according to the present embodiments performs load free driving (LFD) that applies a signal corresponding to the touch driving signal TDS to the pattern disposed on the display panel 110.

The LFD may be a driving technique that prevents the generation of the parasitic capacitance Cp acting as a load at the time of touch driving and may be performed together with touch driving.

The pattern of conductive elements allowing for the LFD is referred to as a load free driving pattern (LFD pattern), and a signal applied to the LFD pattern is referred to as a load free driving signal (LFD signal).

The LFD pattern may be all of electrodes and lines that are disposed around the common electrode CEs to which the touch driving signal TDS is applied and are able to generate the parasitic capacitance Cp together with the common electrode CEs and may be, for example, at least one of the data line DL, the gate line GL, and the other common electrodes CEo to which the touch driving signal TDS is not applied.

Figure 7:
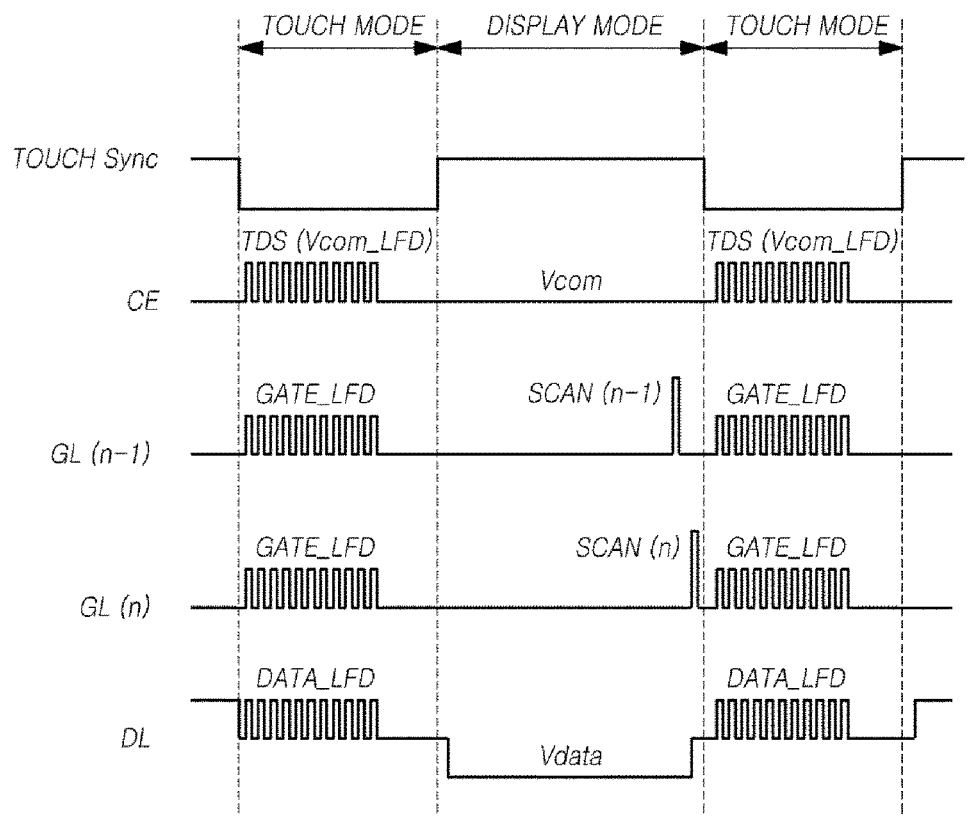
FIG. 7 is a diagram illustrating main signals in the display mode and the touch mode of the touch display device according to the present embodiments.

FIG. 7 is a diagram illustrating main signals in the display mode and the touch mode of the touch display device 100 according to the present embodiments.

Referring to FIG. 7, the display mode and the touch mode may be time-divided and may be alternately performed.

Referring to FIG. 7, the touch system and display driving configurations in the touch display device 100 may recognize the display mode and the touch mode through a touch sync signal Touch Sync. The touch sync signal Touch Sync may be a control signal output from the controller 140 or the micro control unit MCU.

The signal level or state of the touch synch signal Touch Sync indicates whether the system is in a display mode or a touch mode. When a signal level of the touch sync signal Touch Sync is in a high state (or low state), the display mode may be performed, and when the signal level of the touch sync signal Touch Sync is in a low state (or high state), the touch mode may be performed.

The main signals illustrated in FIG. 7 are signals corresponding to a case in which the common electrode CE, the data line DL, and the gate line GL are load-free-driven.

Referring to FIG. 7, during the touch mode, a touch driving signal TDS is applied to a common electrode CEs that is being touch-driven. A common electrode load free driving signal Vcom-LFD is applied to a different common electrode CEo that is being load-free-driven. At least one of a phase or an amplitude of the common electrode load free driving signal Vcom-LFD corresponds to the touch driving signal TDS.

The other common electrode CEo being load-free-driven may be one or more common electrodes CEo adjacent to the common electrode CEs being touch-driven or may be all remaining common electrodes CEo.

During the display mode, a display mode voltage Vcom is applied to all of the common electrodes CE.

Referring to FIG. 7, during the touch mode, a gate load free driving signal GATE-LFD is applied to a gate line GL(n−1) and a gate line GL(n), which are load-free-driven.

At least one of a phase and an amplitude of the gate load free driving signal GATE-LFD corresponds to the touch driving signal TDS.

The gate line GL(n−1) and the gate line GL(n) being load-free-driven may be at least one gate line adjacent to the common electrode CEs being touch-driven and may be all of gate lines.

During the display mode, a scan signal SCAN(n−1) is applied to the (n−1)$^{th}$ gate line GL(n−1), and a scan signal SCAN(n) is applied to the n$^{th}$ gate line GL(n).

Referring to FIG. 7, during the touch mode, a data load free driving signal DATA-LFD is applied to a data line DL being load-free-driven. At least one of a phase and an amplitude of the data load free driving signal DATA-LFD corresponds to the touch driving signal TDS.

The data line DL being load-free-driven may be at least one data line adjacent to the common electrode CEs being touch-driven and may be all data lines.

During the display mode, a data voltage Vdata may be applied to the data line DL. When the touch display device 100 is a liquid crystal display device, while a polarity is inversed in every display mode, the data voltage Vdata may be applied.

Hereinafter, a sensing destabilizing phenomenon and a touch sensing noise according to the sensing destabilizing phenomenon will be described, the sensing destabilizing phenomenon occurring in a case in which the display mode and the touch mode are performed by being time-divided and in a case in which the LFD is applied.

Figure 8:
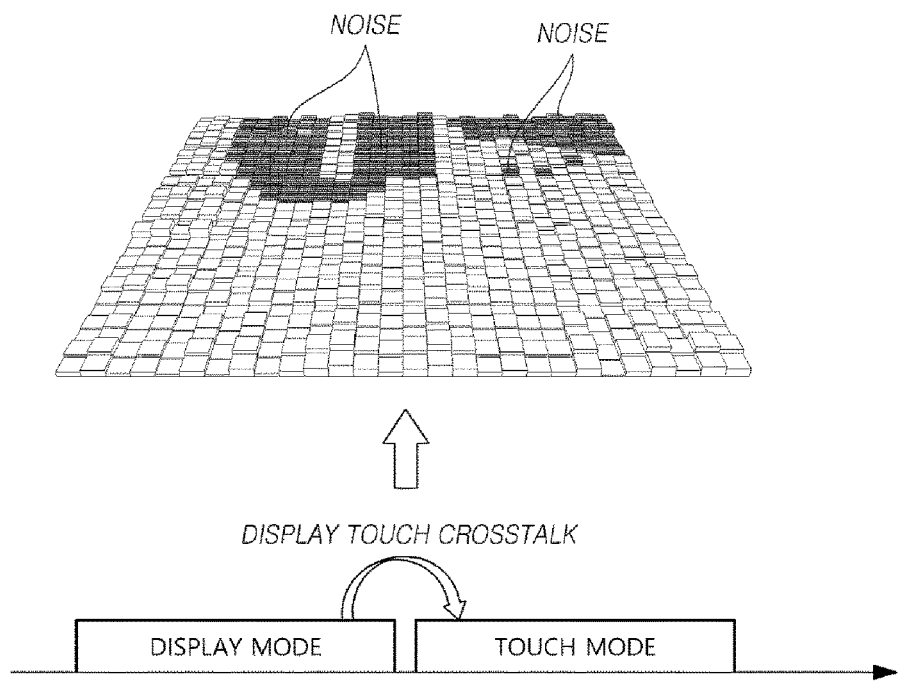
FIG. 8 is a diagram illustrating a sensing destabilizing phenomenon caused by display touch crosstalk in the touch display device according to the present embodiments.

FIG. 8 is a diagram illustrating a sensing destabilizing phenomenon caused by display touch crosstalk in the touch display device 100 according to the present embodiments.

As described above, since the common electrode CE is a common mode electrode that operates as a touch electrode in the touch mode and operates as a display electrode in the display mode, the touch display device 100 alternately performs a display function and a touch sensing function by dividing one frame into the display mode and the touch mode.

Referring to FIG. 8, when the common electrode CE enters the touch mode from the display mode, the common electrode CE receives the touch driving signal TDS but may be in a "sensing-destabilized state" in which the common electrode CE is not ready to normally start touch driving and touch sensing (set a voltage state).

In other words, after the display mode is ended, as the touch mode is performed, when the touch driving signal TDS is abruptly applied to the common electrode CE to which the display mode voltage Vcom is applied during the display mode, the common electrode CE may not rapidly become a voltage state required for the touch mode.

When touch sensing is performed in the "sensing-destabilized state" of the common electrode CE, sensing data may include a touch sensing noise. Therefore, an accurate touch sensing result may not be acquired.

More specifically, after the display mode is ended, when the touch mode is performed to perform touch driving and touch sensing, a display image pattern displayed during the display mode may appear as the touch sensing signal TSS or may distort the touch sensing signal TSS. This phenomenon is referred to as "display touch crosstalk."

The display image pattern, which appears as the touch sensing signal TSS and distorts the touch sensing signal TSS in the touch mode, is referred to as a "touch sensing noise."

As a result, when the touch mode is performed immediately after the display mode is ended, the sensing destabilizing phenomenon may be caused by the display touch crosstalk in which the display image pattern displayed on a screen in the display mode appears as the touch sensing signal TSS, that is, the touch sensing noise and distorts the touch sensing signal TSS.

Figure 9:
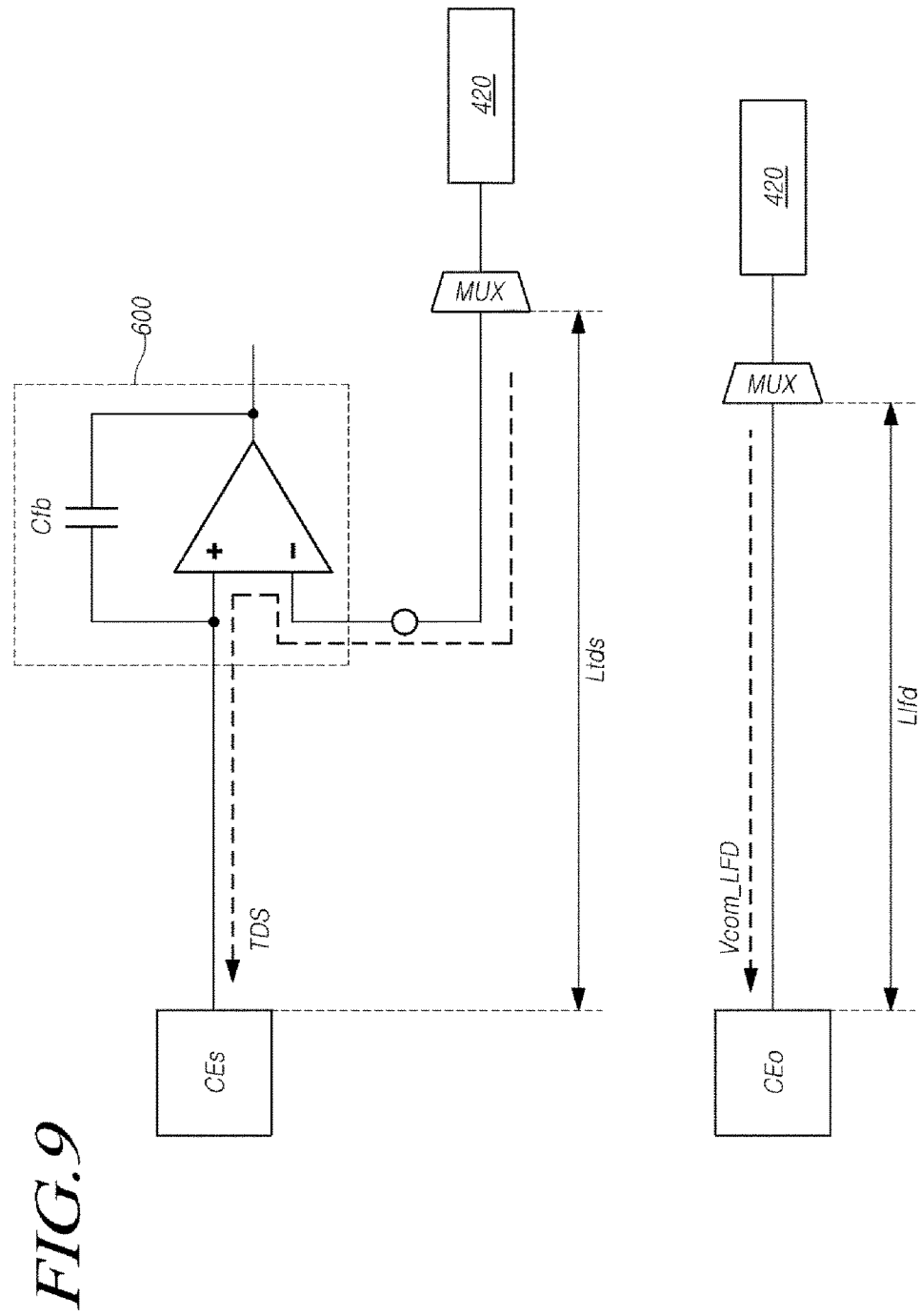
FIG. 9 to FIG. 11 are diagrams illustrating a sensing destabilizing phenomenon caused by signal delay in the touch display device according to the present embodiments.
Figure 10:
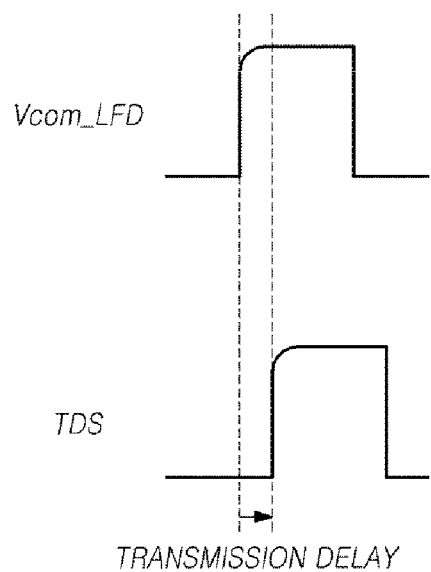
Figure 11:
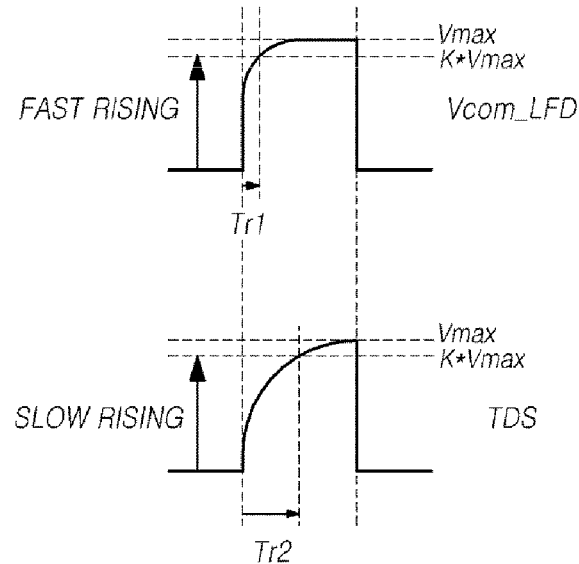

FIG. 9 to FIG. 11 are diagrams illustrating a sensing destabilizing phenomenon caused by signal delay in the touch display device 100 according to the present embodiments.

Referring to FIG. 9, as described above, a signal transmission pathway through which the touch driving signal TDS, output from the power control circuit 420 of the signal providing circuit 310 and passing through the multiplexer MUX, is transferred to the common electrode CEs touch-driven and touch-sensed is different from a signal transmission pathway through which the common electrode load free driving signal Vcom-LFD, output from the power control circuit 420 and passing through the multiplexer MUX, is transferred to the common electrode CEo being load-free-driven.

Referring to FIG. 9, the touch driving signal TDS passing through the multiplexer MUX is transferred to the common electrode CEs touch-driven and touch-sensed through the integrator 600. The common electrode load free driving signal Vcom-LFD does not pass through the integrator 600 and is directly transferred to the common electrode CEo being load-free-driven.

Therefore, a length Ltds of the signal transmission pathway in which the touch driving signal TDS is transferred to the common electrode CEs touch-driven and touch-sensed is greater than a length Llfd of the signal transmission pathway in which the common electrode free driving signal Vcom-LFD is transferred to the common electrode CEo being load-free-driven.

In addition, a process of passing the touch driving signal TDS from the negative terminal (−) of the integrator 600 to the positive terminal (+) thereof, is required for transferring the touch driving signal TDS to the common electrode CEs touch-driven and touch-sensed, but the process is not required for transferring the common load free driving signal Vcom-LFD to the common electrode CEo being load-free-driven.

Due to the points described above, although the touch driving signal TDS and the common electrode free driving signal Vcom-LFD output from the power control circuit 420 have the same signal waveform (for example, the same phase and the same amplitude), when the touch driving signal TDS and the common electrode free driving signal Vcom-LFD are actually applied to the common electrode CEs touch-driven and touch-sensed and the common electrode CEo being load-free-driven, respectively, signal waveforms may be changed as illustrated in FIG. 10 or 11.

Referring to FIG. 10, since the length Ltds of the signal transmission pathway for the touch driving signal TDS actually applied to the common electrode CEs being touch-driven and touch-sensed is greater than the length Llfd of the signal transmission pathway for the common electrode load free driving signal Vcom-LFD applied to the common electrode CEo being load-free-driven (Ltds>Llfd), a signal transmission delay of the touch driving signal TDS is greater than a signal transmission delay of the common electrode load free signal Vcom-LFD, resulting in delaying a rise time of the touch driving signal TDS.

The delay of the rise time may cause a signal transmission delay.

Referring to FIG. 11, although signal rising starts at the same time, due to the additional process of passing the touch driving signal TDS through the integrator 600, the touch driving signal TDS actually applied to the common electrode CEs touch-driven and touch-sensed may have a longer rise time compared to the common electrode load free driving signal Vcom-LFD actually applied to the common electrode CEo being load-free-driven. The rise time is a time elapsed until a voltage is increased to a voltage (k times a maximum high level voltage, where k is a value set to the range of 0.5 to 1) in which a change from a low level to a high level is recognized.

That is, assuming that the rise time of the common electrode load free driving signal Vcom-LFD applied to the common electrode CEo being load-free-driven is TR1, the rise time of the touch driving signal TDS actually applied to the common electrode CEs touch-driven and touch-sensed is TR2, which is greater than TR1.

In other words, the common electrode load free driving signal Vcom-LFD applied to the common electrode CEo being load-free-driven has a fast rise time, but the touch driving signal TDS applied to the common electrode CEs touch-driven and touch-sensed has a slow rise time.

The slow rise time of the touch driving signal TDS actually applied to the common electrode CEs touch-driven and touch-sensed also corresponds to a kind of signal delay.

As described above with reference to FIG. 9 to FIG. 11, although the LFD is performed to prevent the generation of the parasitic capacitance, the parasitic capacitance between the common electrode CEs touch-driven and touch-sensed and the common electrode CEo being load-free-driven may be generated by a signal delay difference (i.e., 1. a signal delay difference due to a transmission delay difference and 2. a signal delay difference due to a rise time difference) between the touch driving signal TDS and the common electrode free driving signal Vcom-LFD.

Therefore, the signal delay difference between the touch driving signal TDS and the common load free driving signal Vcom-LFD may act as touch sensing noise that causes the sensing destabilizing phenomenon.

According to the present embodiments, a pre-setting scheme for preparing to perform touch driving and touch sensing prior to performing touch driving is provided as a method of minimizing the sensing destabilizing phenomenon caused by the display touch crosstalk and the sensing destabilizing phenomenon caused by the signal delay difference.

Hereinafter, the pre-setting scheme for sensing stabilization will be described in more detail.

Figure 12:
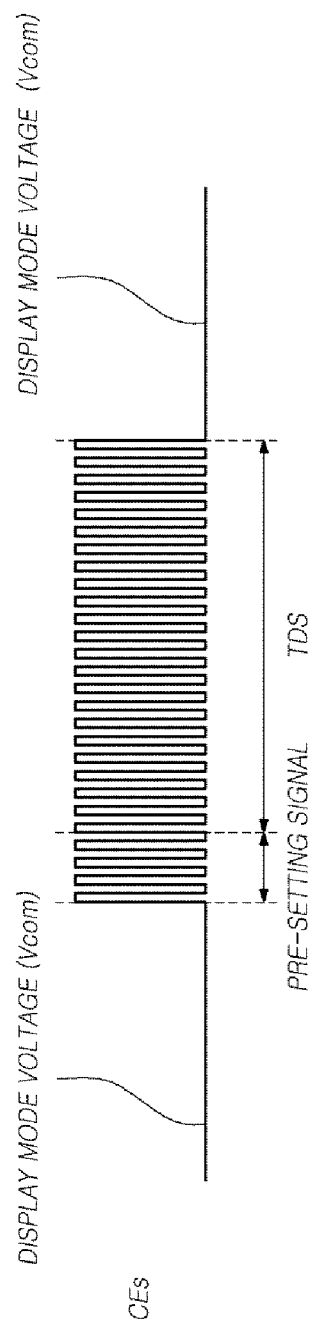
FIG. 12 is a diagram illustrating a pre-setting scheme for sensing stabilization in the touch display device according to the present embodiments.

FIG. 12 is a diagram illustrating the pre-setting scheme for sensing stabilization in the touch display device 100 according to the present embodiments.

Referring to FIG. 12, in the touch screen device 100 according to the present embodiments, before sequentially driving M electrode groups (when M=n, N common electrodes), the touch circuit 200 may output a "pre-setting dummy pulse signal" to at least one of the M common electrode groups. The outputting of the pre-setting dummy pulse signal to the common electrode CE is referred to as "pre-setting driving."

As described above, before the M common electrode groups (N common electrodes when M=N) are sequentially driven, by applying the "pre-setting dummy pulse signal" to the at least one of the M common electrode groups, a voltage state required for touch driving and touch sensing may rapidly occur in the common electrode CE to which the pre-setting dummy pulse signal is applied.

That is, as the pre-setting dummy pulse signal is pre-applied to the common electrode CE before the touch driving signal TDS is applied, the display touch crosstalk can be removed or reduced, and the signal delay difference can also be removed or reduced, thereby stabilizing sensing.

Referring to FIG. 12, the pre-setting dummy pulse signal may have substantially the same phase as the touch driving signal TDS.

As described above, a state of the common electrode CE, to which the pre-setting dummy pulse signal is applied before touch driving, may be set to be substantially the same as a state of the common electrode CE to which the touch driving signal TDS is applied. This is done by setting the phase of the pre-setting dummy pulse signal so as to be substantially the same as the phase of the touch driving signal TDS, thereby efficiently stabilizing sensing and efficiently performing pre-setting driving.

The common-electrode CE, to which the pre-setting dummy pulse signal is applied, may be the common electrode CEs to which the touch driving signal TDS is to initially be applied. The common-electrode to which the pre-setting dummy pulse signal is applied may also be one or more common electrodes CEo different from the common electrode CEs, and may be all common electrodes.

Figure 13:
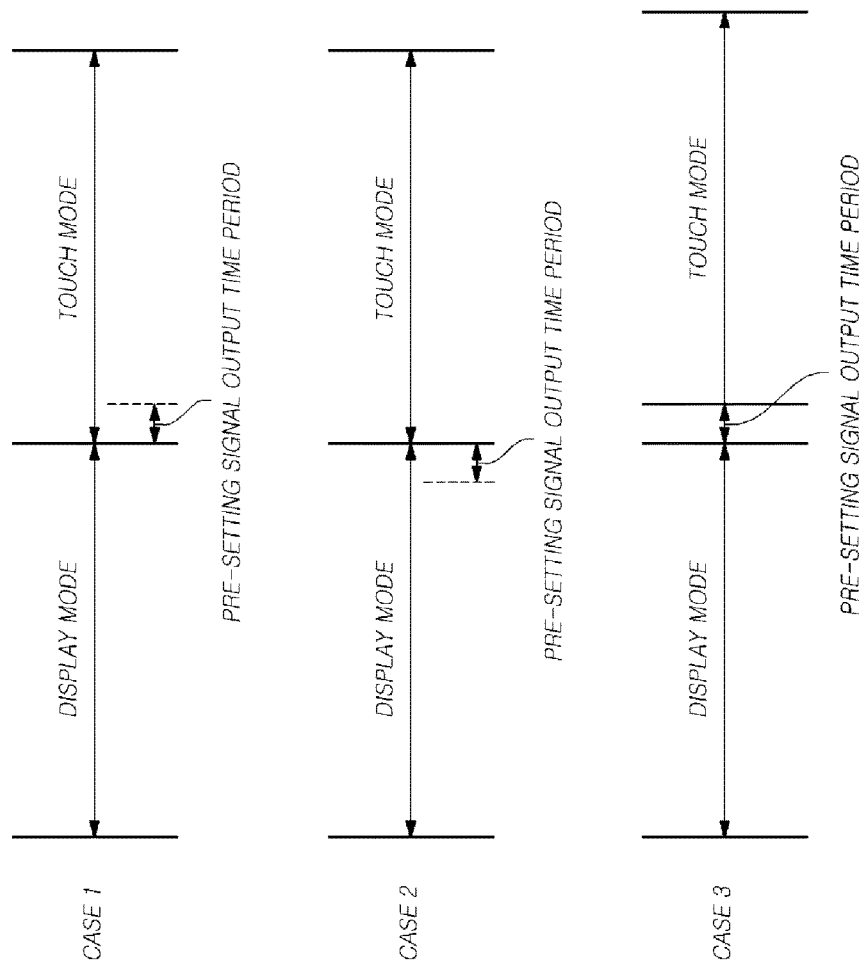
FIG. 13 is a diagram illustrating three types of time periods in which a pre-setting signal for sensing stabilization is output in the touch display device according to the present embodiments.

FIG. 13 is a diagram illustrating three types of time periods in which a pre-setting dummy pulse signal for sensing stabilization is output in the touch display device 100 according to the present embodiments.

Referring to FIG. 13, the time period, i.e., a pre-setting output time periods, in which the pre-setting dummy pulse signal is output in the touch circuit 200, may be, for example, a time period that is the front portion of the touch mode (Case 1), a time period that is the end portion of the display mode (Case 2), or a time period between the display mode and the touch mode (Case 3).

As described above, the pre-setting dummy pulse signal output time period may be variously designed, thereby reducing the influence of pre-setting driving on the display mode and the touch mode or enabling efficient pre-setting driving.

Figure 14:
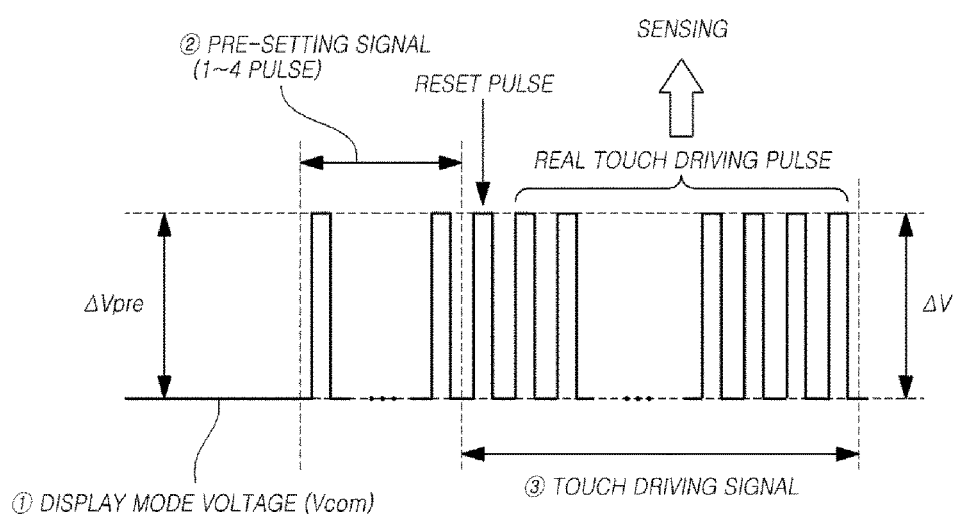
FIG. 14 is a diagram illustrating signals applied to a common electrode between the display mode and the touch mode when the pre-setting scheme is utilized in the touch display device according to the present embodiments.

FIG. 14 is a diagram illustrating signals applied to the common electrode between the display mode and the touch mode when the pre-setting scheme is utilized in the touch display device 100 according to the present embodiments.

Referring to FIG. 14, the pre-setting dummy pulse signal may have a pulse signal form and may include, for example, one or more dummy pulses.

For example, the pre-setting dummy pulse signal may include 1 to 4 dummy pulses.

Regarding the number of the pre-setting dummy pulses, when the pre-setting dummy pulse signal is set to a small number of pulses, while the influence is minimized on the display mode and/or the touch mode, pre-setting driving may be performed, but performance of sensing stabilization may be reduced according to pre-setting driving.

On the contrary, when the pre-setting dummy pulse signal is set to a large number of pulses, pre-setting driving may more greatly influence the display mode and/or the touch mode, but the performance of the sensing stabilization may be improved according to pre-setting driving.

Therefore, the number of the dummy pulses constituting the pre-setting dummy pulse signal may be efficiently adjusted by taking into consideration the performance of the sensing stabilization according to pre-setting driving and the efficiency and performance of the display mode and/or the touch mode by pre-setting driving.

The touch driving signal TDS may include, for example, one or more reset pulses and one or more real touch driving pulses or may include one or more real touch driving pulses.

The one or more reset pulses are pulses that function to indicate a start of touch driving in the touch mode or function to indicating a start of touch driving according to the common electrode groups in the touch mode.

The one or more real touch driving pulses are pulses used in actual touch driving.

The touch circuit 200 may sense a touch by extracting only a portion of the touch sensing signal TSS corresponding to the real touch driving pulses from which pulses corresponding to the pre-setting dummy pulse signal and the reset pulse are removed, the touch sensing signal TSS being received from the common electrode groups to which the touch driving signal TDS is applied.

According to the signal waveform described above, the touch circuit 200 may easily grasp the start of touch driving in the touch mode or easily grasp the start of touch driving according to the common electrode groups in touch mode by using the one or more reset pulses, and may sense a touch by grasping pulses corresponding to the one or more reset pulses.

In addition, among a plurality of pulses constituting the touch sensing signal TSS, only a pulse generated in relation to the real touch driving pulse may be extracted and used in touch sensing by removing pulses generated by pre-setting dummy pulses and reset pulses which are not substantially related to touch driving but are additionally applied to the common electrode. This can consequently prevent the sensing destabilizing phenomenon caused by the sensing display touch crosstalk and the sensing destabilizing phenomenon caused by the signal delay difference and also performing accurate touch sensing.

Specifically, when the dummy pulses or reset pulses are being driven onto the common electrodes, a touch sensing signal TSS is still generated from the dummy pulses and reset pulses, and the ADC of the sensing data generator circuit 340 still generates sensing data from TSS. However, the touch sensing circuit 350 simply disregards the sensing data as being dummy sensing data or reset sensing data.

Figure 15:
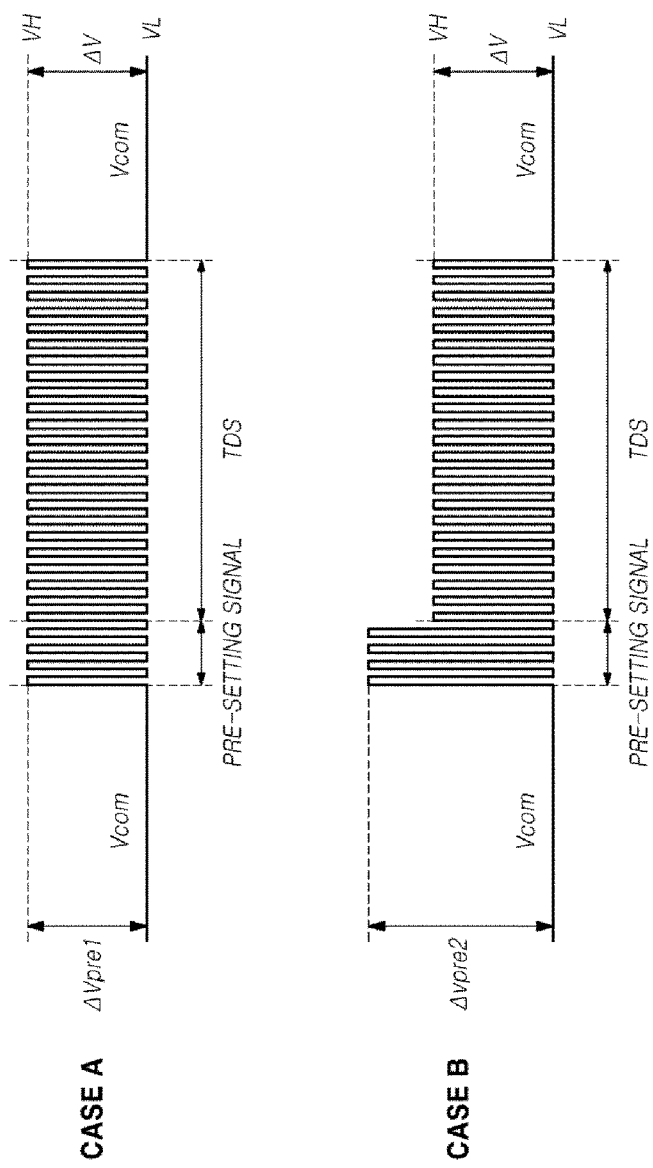
FIG. 15 and FIG. 16 are diagrams illustrating examples of signal waveforms in a pre-setting signal for sensing stabilization in the touch display device according to the present embodiments.
Figure 16:
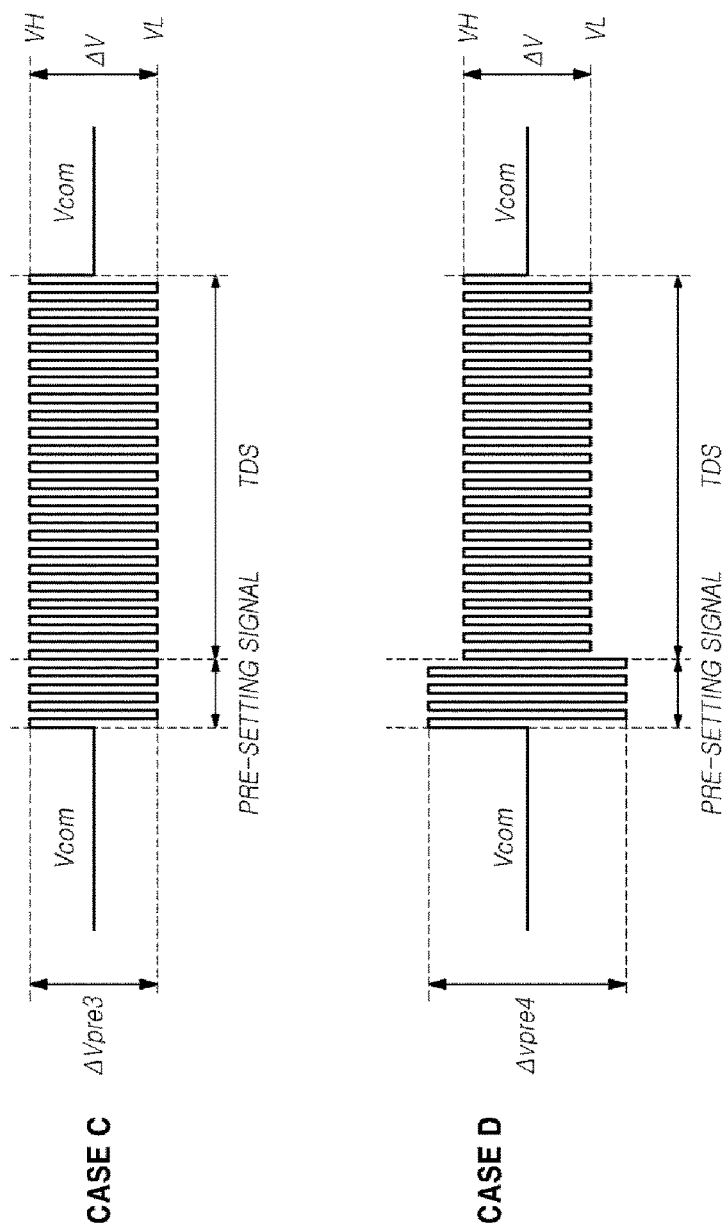

FIG. 15 and FIG. 16 are diagrams illustrating examples of signal waveforms in the pre-setting dummy pulse signal for sensing stabilization in the touch display device 100 according to the present embodiments.

The pre-setting dummy pulse signal for sensing stabilization may include one or more pulses and may be generated in various signal waveforms. That is, the pre-setting dummy pulse signal may be generated by variously setting an amplitude, a reference swing voltage, and the like.

Cases A, B, C, and D are illustrated in FIG. 15 and FIG. 16 as examples according to a design change of an amplitude ΔVpre and a voltage Vcom that is the reference of the swing.

Referring to FIG. 15 and FIG. 16, the touch driving signal TDS may be a pulse modulation signal that swings between a high level voltage VH and a low level voltage VL, and the pre-setting dummy pulse signal may be the pulse modulation signal like the touch driving signal TDS.

Referring to FIG. 15 and FIG. 16, as in cases A and B, each of amplitudes ΔVpre1 and ΔVpre3 in the pre-setting dummy pulse signal may be substantially the same as an amplitude ΔV of the touch driving signal TDS.

As described above, when the pre-setting dummy pulse signal having the same amplitude as the touch driving signal TDS is generated, the pre-setting dummy pulse signal may be easily generated.

Referring to FIG. 15 and FIG. 16, as in cases B and D, each of amplitudes ΔVpre2 and ΔVpre4 in the pre-setting dummy pulse signal may be greater than the amplitude ΔV of the touch driving signal TDS.

As described above, when the pre-setting dummy pulse signal having the amplitude greater than the amplitude of the touch driving signal TDS is generated, the common electrode CE may be more rapidly set to a voltage state in which normal touch driving and touch sensing are performed, thereby more rapidly achieving sensing stabilization according to the pre-setting dummy pulse signal.

Referring to FIG. 15 and FIG. 16, as in cases A and B, each of the pre-setting dummy pulse signal and the touch driving signal TDS is the pulse modulation signal that swings between the high level voltage VH and the low level voltage VL. A low level voltage of each of the pre-setting dummy pulse signal and the touch driving signal TDS is a display mode voltage Vcom.

That is, in cases A and B, each of the pre-setting dummy pulse signal and the touch driving signal TDS is a signal that swings in a manner in which a voltage is raised to the high level voltage and is returned to the low level voltage corresponding to the display mode voltage Vcom.

Referring to FIG. 15 and FIG. 16, as in cases C and D, each of the pre-setting dummy pulse signal and the touch driving signal TDS is the pulse modulation signal that swings between the high level voltage VH and the low level voltage VL. A high level voltage of each of the pre-setting dummy pulse signal and the touch driving signal TDS is higher than the display mode voltage Vcom. The low level voltage of each of the pre-setting dummy pulse signal and the touch driving signal TDS is lower than the display mode voltage Vcom.

That is, in cases C and D, each of the pre-setting dummy pulse signal and the touch driving signal TDS is the signal that swings in a manner in which a voltage is raised to the high level voltage and is returned to the low level voltage with respect to the display mode voltage Vcom.

According to a swing property of the presetting signal and the touch driving signal TDS described above, a voltage range used for touch driving and pre-setting driving may be set to a voltage range available in the touch display device 100.

Figure 17:
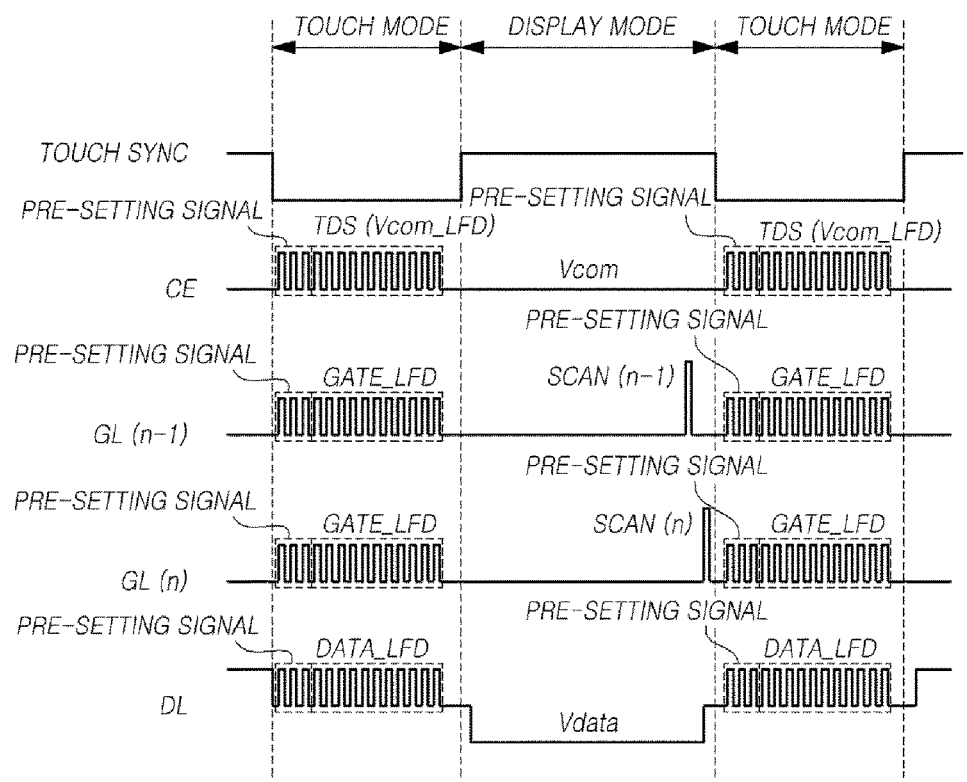
FIG. 17 is a diagram illustrating main signals in the display mode and the touch mode when the pre-setting scheme is utilized in the touch display device according to the present embodiments.

FIG. 17 is a diagram illustrating main signals in the display mode and the touch mode when the pre-setting scheme is utilized in the touch display device 100 according to the present embodiments.

Referring to FIG. 17, the display mode and the touch mode may be time-divided and may be alternately performed.

The main signals illustrated in FIG. 17 are signals corresponding to a case in which the LFD and the pre-setting driving are performed on the common electrode CE, the data line DL, and the gate line GL.

Referring to FIG. 17, according to the load free driving, during the touch mode, load free driving signals Vcom-LFD, GATE_LFD, and DATA_LFD, a phase of each of which is substantially the same as a phase of the touch driving signal TDS, may be applied to a load free driving pattern pre-defined on the display panel 110.

The load free driving pattern being load-free-driven may be, for example, at least one data line DL, at least one gate line GL(n−1) or GL(n), or at least one common electrode CE, may also be a pattern such as an electrode or a voltage wiring, adjacent to the common electrode CEs to which the touch driving signal TDS is applied, and in some cases, may be all of patterns in the display panel 110.

According to the load free driving described above, during the touch mode, parasitic capacitance may be prevent from being unnecessarily generated, thereby improving touch sensing accuracy.

Referring to FIG. 17, during the touch mode, the touch driving signal TDS is applied to the common electrode CEs being touch-driven. In addition, the common electrode load free driving signal Vcom-LFD is applied to a common electrode CEo corresponding to the load free driving pattern being load-free-driven. At least one of a phase and an amplitude of Vcom-LFD corresponds to the touch driving signal TDS, The common electrode CEo being load-free-driven may be one or more common electrodes CEo adjacent to the common electrode CEs being touch-driven or may be all remaining common electrodes CEo.

Before the touch driving signal TDS is applied, the pre-setting dummy pulse signal may be pre-applied to the relevant common electrode CEs.

At this time, before the common electrode load free driving signal Vcom-LFD is applied to the common electrode CEo corresponding to the load free driving pattern, the pre-setting dummy pulse signal (pre-setting dummy pulse signal for load free driving) corresponding to the common electrode load free driving signal Vcom-LFD may be pre-applied to the relevant common electrode CEo.

During the display mode, a display mode voltage Vcom is applied to all of the common electrodes CE.

Referring to FIG. 17, during the touch mode, the gate load free driving signal GATE-LFD is applied to gate lines GL(n−1) and GL(n) being load-free-driven. At least one of a phase and an amplitude of GATE-LFD corresponds to the touch driving signal TDS.

The gate lines GL(n−1) and the GL(n) being load-free-driven may be at least one gate line adjacent to the common electrode CEs being touch-driven and may be all of gate lines.

Before the common electrode load free driving signal Vcom-LFD is applied to the gate lines GL(n−1) and GL(n) corresponding to the load free driving pattern to be load-free-driven, the pre-setting dummy pulse signal (pre-setting dummy pulse signal for load free driving) corresponding to the gate load free driving signal GATE-LFD may be pre-applied to the gate lines GL(n−1) and GL(n).

During the display mode, a scan signal SCAN(n−1) is applied to the (n−1)$^{th}$ gate line GL(n−1), and a scan signal SCAN(n) is applied to the n$^{th}$ gate line GL(n).

Referring to FIG. 17, during the touch mode, the data load free driving signal DATA-LFD is applied to a data line DL being load-free-driven. At least one of a phase and an amplitude of DATA-LFD corresponds to the touch driving signal TDS.

The data line DL corresponding to the load free driving pattern being load-free-driven may be at least one data line adjacent to the common electrode CEs touch-driven and may be all of data lines.

Before the data load free driving signal DATA-LFD is applied to the data line DL corresponding to the load free driving pattern to be load-free-driven, the pre-setting dummy pulse signal (pre-setting dummy pulse signal for load free driving) corresponding to the data load free driving signal DATA-LFD may be pre-applied to the data line DL corresponding to the load free driving pattern.

During the display mode, the relevant data voltage Vdata may be applied to the data line DL. When the touch display device 100 is a liquid crystal display device, while a polarity is inversed in every display mode, the data voltage Vdata may be applied.

As described above, even before the load free driving signals Vcom LFD, GATE_LFD, and DATA_LFD are applied, the pre-setting dummy pulse signal may be applied to the load free driving patterns CEo, GL, and DL, thereby improving the stabilization of the load free driving. In addition, the touch sensing accuracy may be improved by normally performing the load free driving.

Hereinafter, as in FIG. 5, when touch driving is performed according to the common electrode groups, a method of applying a pre-setting scheme will be described. Of course, even in the case of FIG. 4, assuming that one common electrode is one common electrode group, it may be considered that touch driving is performed according to the common electrode groups.

Figure 18:
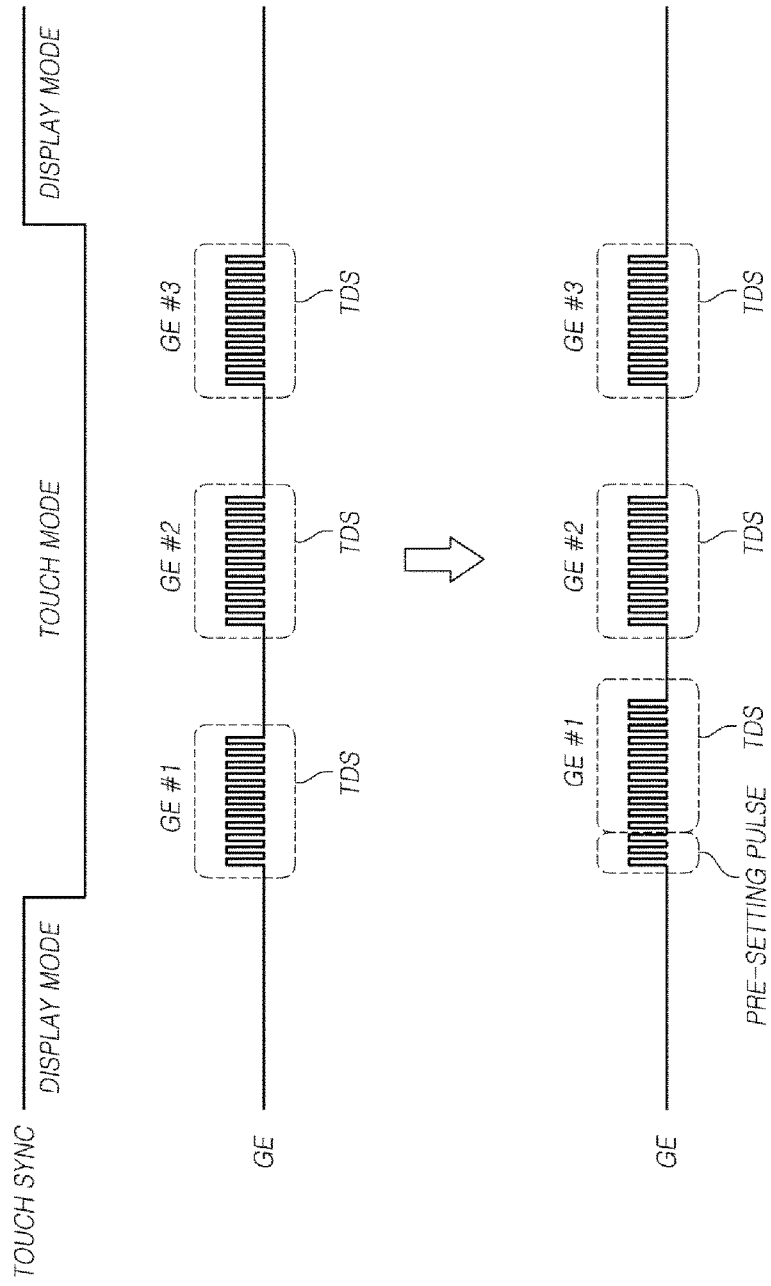
FIG. 18 is a diagram illustrating a application of the pre-setting scheme when driving is performed according to common electrode groups in the touch display device according to the present embodiments.

FIG. 18 is a diagram illustrating an application of the pre-setting scheme when driving is performed according to the common electrode groups in the touch display device 100 according to the present embodiments.

Referring to FIG. 18, in the touch screen device 100 according to the present embodiments, when driving is performed according to the common electrode groups, during the touch mode, the touch circuit 200 may output the pre-setting dummy pulse signal before outputting the touch driving signal TDS, to be applied to a common electrode group GE #1 that is initially driven.

That is, although a plurality of common electrode groups GE #1, GE #2, and GE #3 are touch-driven with respect to one touch mode, the touch circuit 200 may generate the pre-setting dummy pulse signal before applying the touch driving signal TDS to the common electrode group GE #1 to be initially touch-driven.

Accordingly, although touch driving is performed according to the common electrode groups, and the plurality of common electrode groups GE #1, GE #2, and GE #3 are sequentially touch-driven with respect to the one touch mode, pre-setting driving may be efficiently performed by generating the pre-setting dummy pulse signal only once.

Figure 19:
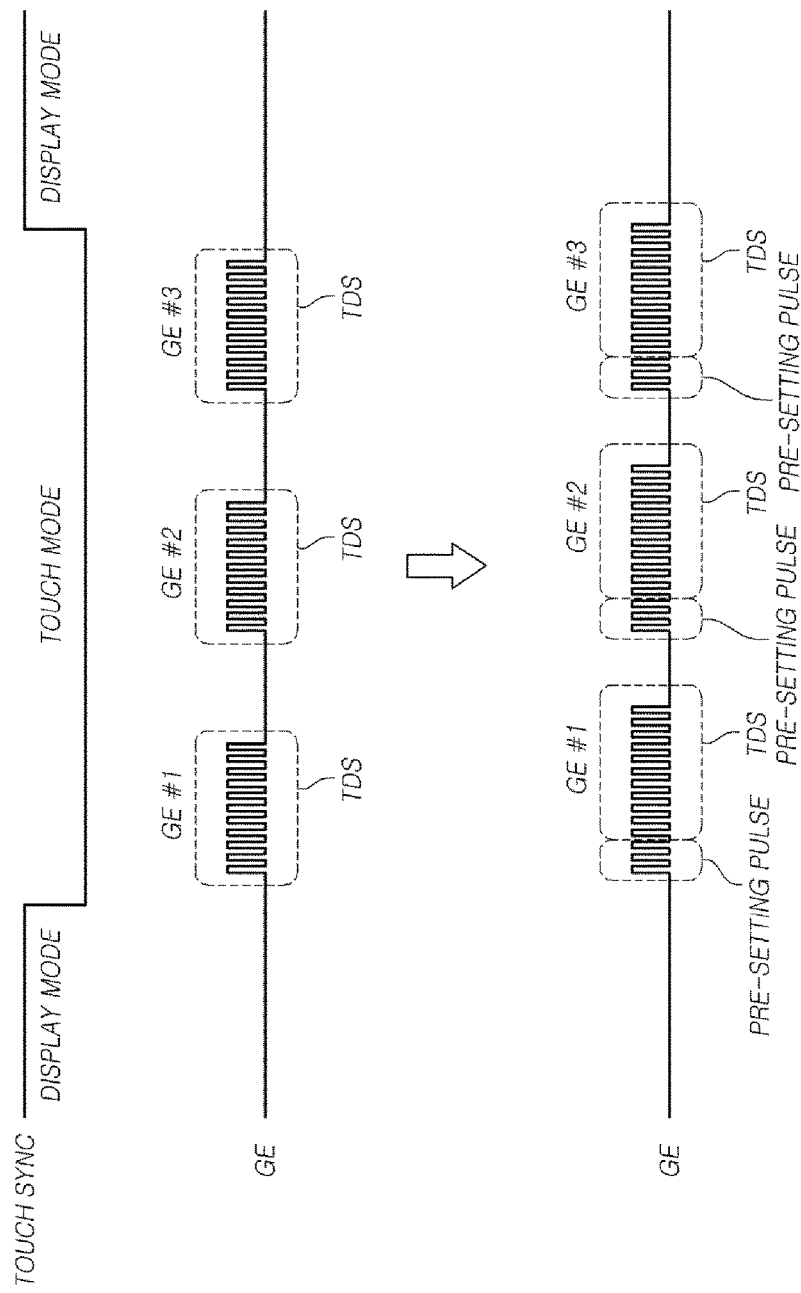
FIG. 19 is a diagram differently illustrating an application of the pre-setting scheme when driving is performed according to the common electrode groups in the touch display device according to the resent exemplary embodiments.

FIG. 19 is a diagram differently illustrating an application of the pre-setting scheme when driving is performed according to the common electrode groups in the touch display device 100 according to the present exemplary embodiments.

Referring to FIG. 19, in the touch screen device 100 according to the present embodiments, when driving is performed according to the common electrode groups, during the touch mode, the touch circuit 200 may output the pre-setting dummy pulse signal each time before outputting the touch driving signal TDS, to be applied to each of common electrode groups that are sequentially driven.

That is, although a plurality of common electrode groups GE #1, GE #2, and GE #3 are touch-driven with respect to one touch mode, the touch circuit 200 may generate the pre-setting dummy pulse signal corresponding to each of the plurality of common electrode groups GE #1, GE #2, and GE #3 before applying the touch driving signal TDS to each of the plurality of common electrode groups GE #1, GE #2, and GE #3.

Accordingly, although touch driving is performed according to the common electrode groups, and the plurality of common electrode groups GE #1, GE #2, and GE #3 are sequentially touch-driven during one touch mode, performance of pre-setting driving may be improved by generating the pre-setting dummy pulse signal each time before each of the plurality of common electrode groups GE #1, GE #2, and GE #3 is touch-driven.

Figure 20:
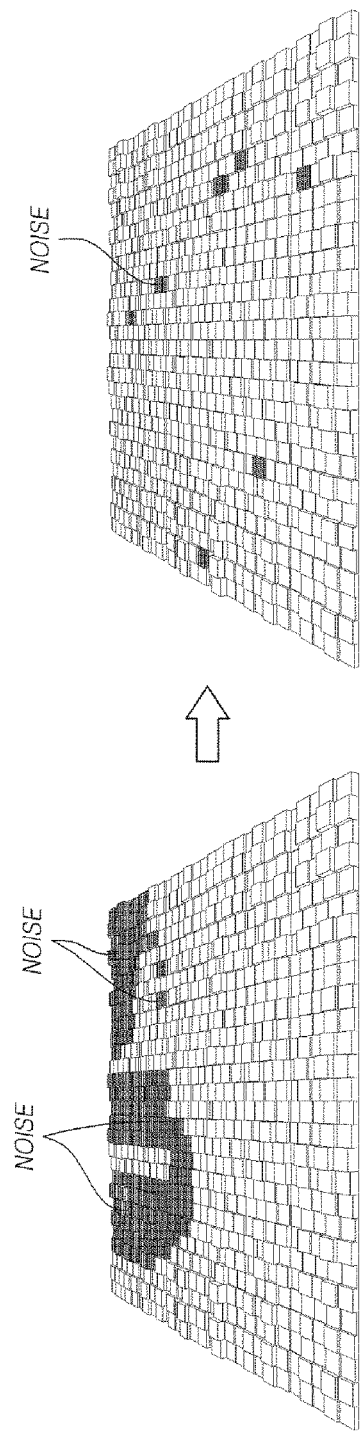
FIG. 20 is a diagram illustrating noise reduction effects that can be obtained using the pre-setting scheme for sensing stabilization in the touch display device according to the present embodiments.

FIG. 20 is a diagram illustrating noise reduction effects that can be obtained using the pre-setting scheme for sensing stabilization in the touch display device 100 according to the present embodiments.

FIG. 20 is a diagram illustrating a position in which touch sensing noise occurs when the pre-setting scheme is not applied and a position in which touch sensing noise occurs when the pre-setting scheme is applied.

Referring to FIG. 20, when the pre-setting scheme is not applied, touch sensing noises occurring at a plurality of points are observed since sensing is destabilized due to sensing display touch crosstalk and signal delay.

In contrast, when the pre-setting scheme is applied, positions at which sensing noises occur and the number of the occurrence of sensing noises are significantly reduced, since the pre-setting scheme can promote sensing stabilization by preventing the sensing destabilization due to the display-touch crosstalk and the sensing destabilization due to the signal delay.

The foregoing descriptions have been made to the pre-setting scheme for preventing the sensing destabilizing phenomenon occurring when the display mode is ended and the touch mode begins to be performed or the sensing destabilizing phenomenon occurring during the touch mode.

That is, the pre-setting scheme of previously supplying the pre-setting dummy pulse signal to the N number of common electrodes before the touch circuit 200 drives the N number of common electrodes during the touch mode and the sensing stabilization based on the pre-setting scheme have been described.

When the touch mode is ended and the display mode is performed, touch-display crosstalk, i.e. the influence of the touch driving and the load free driving performed in the touch mode, remains in the display mode. Consequently, the display may be destabilized or may malfunction.

Hereinafter, a post-setting scheme for preventing the display destabilization will be described in brief.

Figure 21:
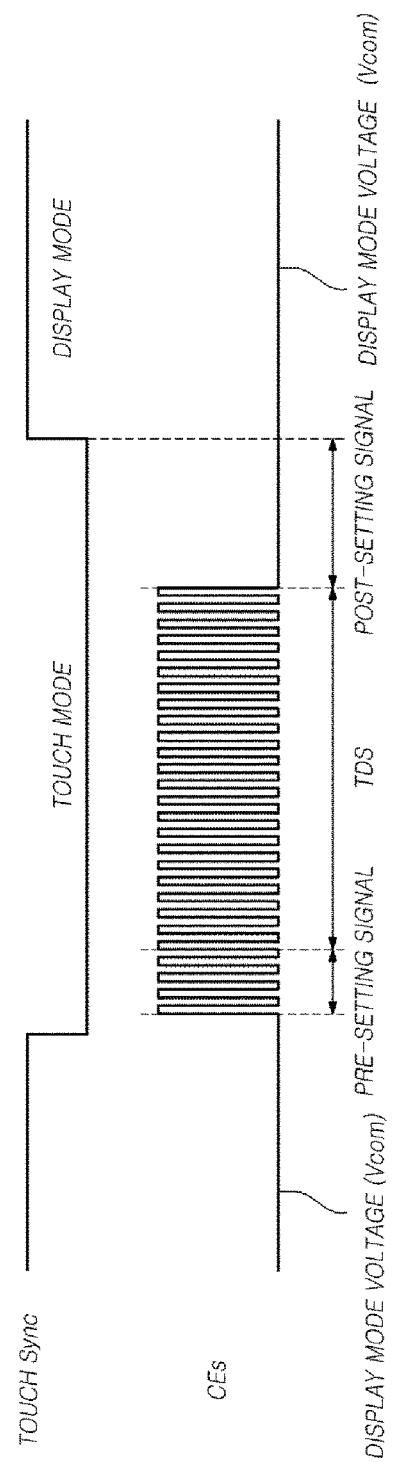
FIG. 21 is a diagram illustrating the post-setting scheme for display stabilization in the touch display device according to the present embodiments.

FIG. 21 is a diagram illustrating the post-setting scheme for display stabilization in the touch display device 100 according to the present embodiments.

Referring to FIG. 21, in the touch display device 100 according to the present embodiments, after the touch circuit 200 applies a touch driving signal TDS to a common electrode group among M number of common electrode groups that is the last to operate during the touch mode, before a display mode voltage Vcom is applied by the touch circuit 200 or the display driver circuit in the display mode, a post-setting signal may be applied to the M number of common electrode groups and/or the load-free driving pattern.

For example, the above-mentioned post-setting signal may have a voltage, the phase, amplitude, and the like of which correspond to those of a display mode voltage.

Here, the display mode voltage may be a common voltage Vcom applied to common electrodes CEs, which were subjected to touch driving and load-free driving during the touch mode, for the purpose of display driving, or may be a data voltage Vdata and a gate voltage VGH and VGL applied to data lines DL and gate lines GL, which were subjected to load-free driving during the touch mode, for the purpose of display driving.

It is possible to prevent the touch-display crosstalk, i.e. the influence of touch driving and load-free driving performed in the touch mode remaining in the display mode, by preemptively forming a display driving preparatory state by previously applying a post-setting signal before display driving is performed immediately after touch driving is ended. This can consequently result in display stabilization and improve image quality in the display mode.

Here, the touch-display crosstalk may mean a phenomenon in which, in the display mode, the voltage state of a common electrode is not directly changed to a display mode voltage Vcom from the voltage state in which touch driving and touch sensing was performed.

In addition, the touch-display crosstalk may mean a phenomenon in which, in the display mode, the voltage state of the load-free-driven common electrode CEo, the data line DL, and the gate line GL is not directly changed to the display mode voltage Vcom, Vdata, or SCAN(VGH, VGL) from the voltage state in which load free driving was performed.

Here, as illustrated in FIG. 21, the time period in which the post-setting signal is applied may be the end portion of the touch mode. In some cases, the time period may be the front portion of the display mode or a time period between the touch mode and the display mode.

As above, the time period in which the post-setting signal is applied may be variously designed, thereby reducing the influence of post-setting driving on the display mode and the touch mode or enabling efficient post-setting driving.

Hereinafter, the above-described respective components of the touch display device 100 according to the present embodiments will be briefly described again.

Figure 22:
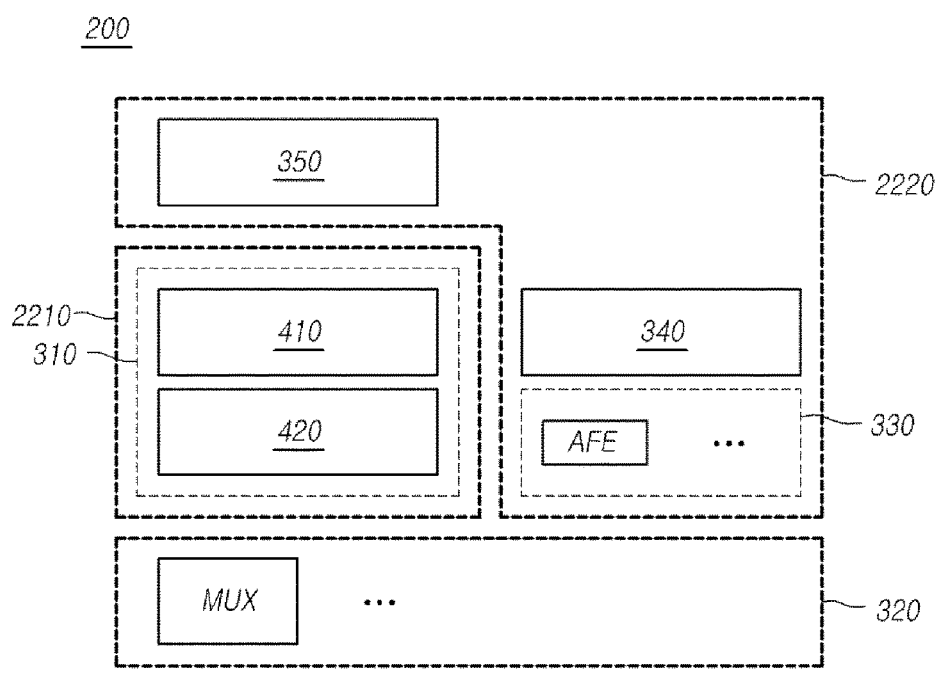
FIG. 22 is a block diagram illustrating a touch circuit of the touch display device according to the present embodiments.

FIG. 22 is a block diagram illustrating the touch circuit 200 of the touch display device 100 according to the present embodiments. In the following description, FIG. 3 to FIG. 5 will also be referred to.

The touch circuit 200 of the touch display device 100 according to the present embodiments illustrated in FIG. 22 includes a touch driver circuit 2210, a switch circuit 320, and a touch sensing circuit 2220.

During the touch mode, the touch driver circuit 2210 can sequentially output a touch driving signal TDS that will be applied to each of the M number of common electrode groups GE #1, GE #2, and GE #3 (2≤M≤N) in order to sequentially drive the M number of common electrode groups in which the N number of common electrodes CE 11, CE 12, CE 13, CE 14, CE 21, CE 22, CE 23, CE 24, CE 31, CE 32, CE 33, and CE 34 are categorized (N=12, where the common electrodes are arranged in the 3×4 matrix, as in FIG. 3 and FIG. 5).

The switch circuit 320 sequentially connects the touch driver circuit 2110 to the M number of common electrode groups GE #1, GE #2, and GE #3 according to the driving sequence (GE #1→GE #2→GE #3) of the M number of common electrode groups GE #1, GE #2, and GE #3.

The touch sensing circuit 2220 can receive a touch sensing signal TSS through the switch circuit 320, the touch sensing signal corresponding to the common electrode groups to which the touch driving signal TDS is applied through the switch circuit 320, and sense a touch based on the touch sensing signal TSS corresponding to each of the common electrode groups.

The touch driver circuit 2210 can output a pre-setting dummy pulse signal to at least one common electrode group or all of the M number of common electrode groups GE #1, GE #2, and GE #3 before sequentially driving the M number of common electrode groups GE #1, GE #2, and GE #3.

Referring to FIG. 22 together with FIG. 3 to FIG. 5, the touch driver circuit 2210 further includes the signal providing circuit 310, which outputs a touch driving signal TDS that will be applied to the common electrode groups connected via the switch circuit 320.

The signal providing circuit 310 may further output a pre-setting dummy pulse signal before sequentially outputting the touch driving signal TDS.

In addition, the touch sensing circuit 2220 further includes the touch sensing signal detection circuit 330, the sensing data generator circuit 340, the touch sensing circuit 350, and the like. The touch sensing signal detection circuit 330 detects the touch sensing signal TSS, received from the common electrode groups to which the touch driving signal TDS is applied, through the switch circuit. The sensing data generator circuit 340 generates sensing data based on the touch sensing signal TSS detected by each of the common electrode groups. The touch sensing circuit 350 senses a touch based on the sensing data.

The use of the touch circuit 200 can prevent the sensing destabilizing phenomenon due to the display-touch crosstalk and the sensing destabilizing phenomenon due to the signal delay difference by previously outputting a pre-setting dummy pulse signal to the corresponding common electrode CE before outputting a touch driving signal, thereby improving the accuracy of touch sensing.

The signal providing circuit 310 includes the pulse generator 410 generating a pulse modulation signal (e.g. a pulse width modulation signal), the power control circuit 420 providing a touch driving signal TDS generated based on the pulse modulation signal, and the like.

The power control circuit 420 can generate the pre-setting dummy pulse signal and the touch driving signal TDS having the same phase based on the phase of the pulse modulation signal.

In addition, the power control circuit 420 can generate a pre-setting dummy pulse signal and a touch driving signal TDS having the same amplitude or corresponding amplitudes based on the amplitude of the pulse modulation signal.

Furthermore, the power control circuit 420 can convert the level (amplitude) of the pre-setting dummy pulse signal and the level (amplitude) of the touch driving signal TDS, which are primarily formed based on the pulse modulation signal.

In addition, the signal providing circuit 310 may further include a level shifter able to convert the level (amplitude) of the pre-setting dummy pulse signal and the level (amplitude) of the touch driving signal TDS output by the power control circuit 420.

The use of the signal providing circuit 310 can generate and provide the touch driving signal TDS for the purpose of touch driving and the pre-setting dummy pulse signal for the purpose of efficient pre-setting driving while efficiently controlling the touch driving signal TDS and the pre-setting dummy pulse signal.

Referring to FIG. 22 together with FIG. 3 to FIG. 5, the touch sensing signal detection circuit 330 includes one or more AFEs.

Referring to FIG. 22 together with FIG. 3 to FIG. 5, the switch circuit 320 includes one or more multiplexers.

In a single time period of the touch mode, the pre-setting dummy pulse signal may be outputted one time, as in FIG. 18, or may be outputted a number of times equal to the number of common electrodes electrically connected to each of the multiplexers of the switch circuit 320 (M, i.e. the number of the common electrode groups).

As described above, pre-setting driving corresponding to the structure of the switch circuit 320, such as the multiplexers and the AFEs, can be provided. In addition, it is possible to design the structure of the switch circuit 320, such as the multiplexers and the AFEs, according to intended pre-setting driving.

The above-described touch circuit 200 can be formed as a single IC. That is, a plurality of components or internal components of the touch circuit 200 may be included as a module in the single IC.

Alternatively, as illustrated in FIG. 4 or FIG. 5, a plurality of components or the internal components of the touch circuit 200 may be connected via signal lines, thereby forming a separate circuit.

Two or more components among the plurality of components of the touch circuit 200 or the internal components thereof may form a separate single circuit or may be embodied as an internal module of another driving chip.

For example, as illustrated in FIG. 4 or FIG. 5, the touch sensing circuit 350 and the pulse generator 410 may be included as an internal module of a micro-control unit (MCU). The power control circuit 420 may be embodied as a separate power management IC. In addition, the switch circuit 320, the touch sensing signal detection circuit 330, the sensing data generator circuit 340, and the like may be included together with a data driver circuit within a driver chip 400, such as a display driver chip or a data driver chip.

As described above, the positions and implementations of the plurality of components or the internal components of the touch circuit 200 may be varied in consideration of the functional and operational characteristics thereof. This makes it possible to design the touch circuit 200 that is structurally and functionally optimized and the touch display device 100 including the same touch circuit.

Figure 23:
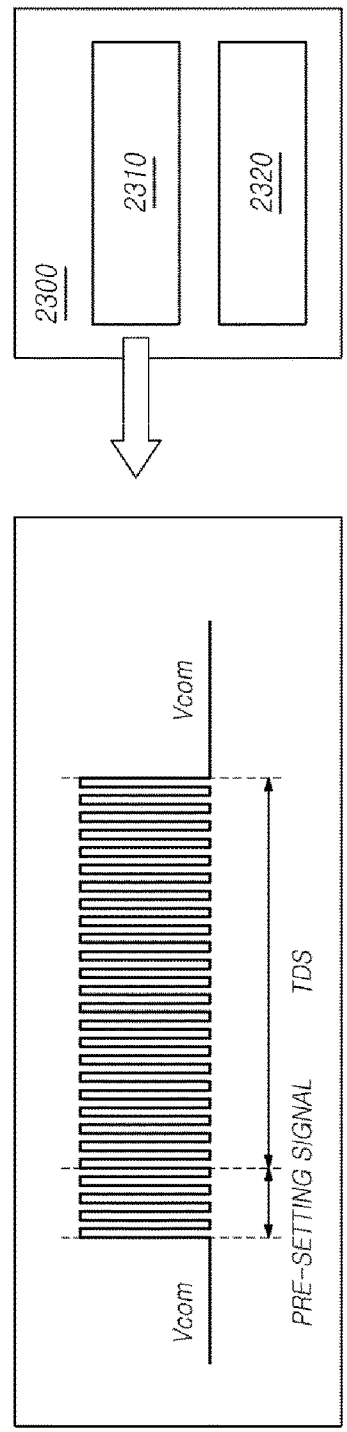
FIG. 23 is a block diagram illustrating a touch IC of the touch display device 100 according to the present embodiments.

FIG. 23 is a block diagram illustrating a touch IC 2300 of the touch display device 100 according to the present embodiments.

Referring to FIG. 23, a description will be given of the touch IC 2300 forming a portion or the entire portions of the touch circuit 200.

Referring to FIG. 23, the touch IC 2300 includes a touch driving module 2310 and a touch sensing module 2320. During the touch mode, the touch driving module 2310 sequentially outputs a touch driving signal TDS to M number of common electrode groups ($2 \leq M \leq N$) into which N number of common electrodes disposed on the display panel 110 are categorized. The touch sensing module 2320 senses a touch based on a touch sensing signal TSS received from each of the common electrode groups.

The touch driving module 2310 can output pre-setting dummy pulse signal before sequentially outputting the touch driving signal TDS to the M number of common electrode groups.

The touch driving module 2310 is a module corresponding to the touch driver circuit 2210 in FIG. 22, and the touch sensing module 2320 is a module corresponding to the touch sensing circuit 2220 in FIG. 23.

Since the use of the touch IC 2300 outputs the pre-setting dummy pulse signal to the corresponding common electrode before outputting the touch driving signal TDS, it is possible to prevent the sensing destabilizing phenomenon due to the display-touch crosstalk and the sensing destabilizing phenomenon due to the signal delay difference, thereby improving the accuracy of touch sensing.

Figure 24:
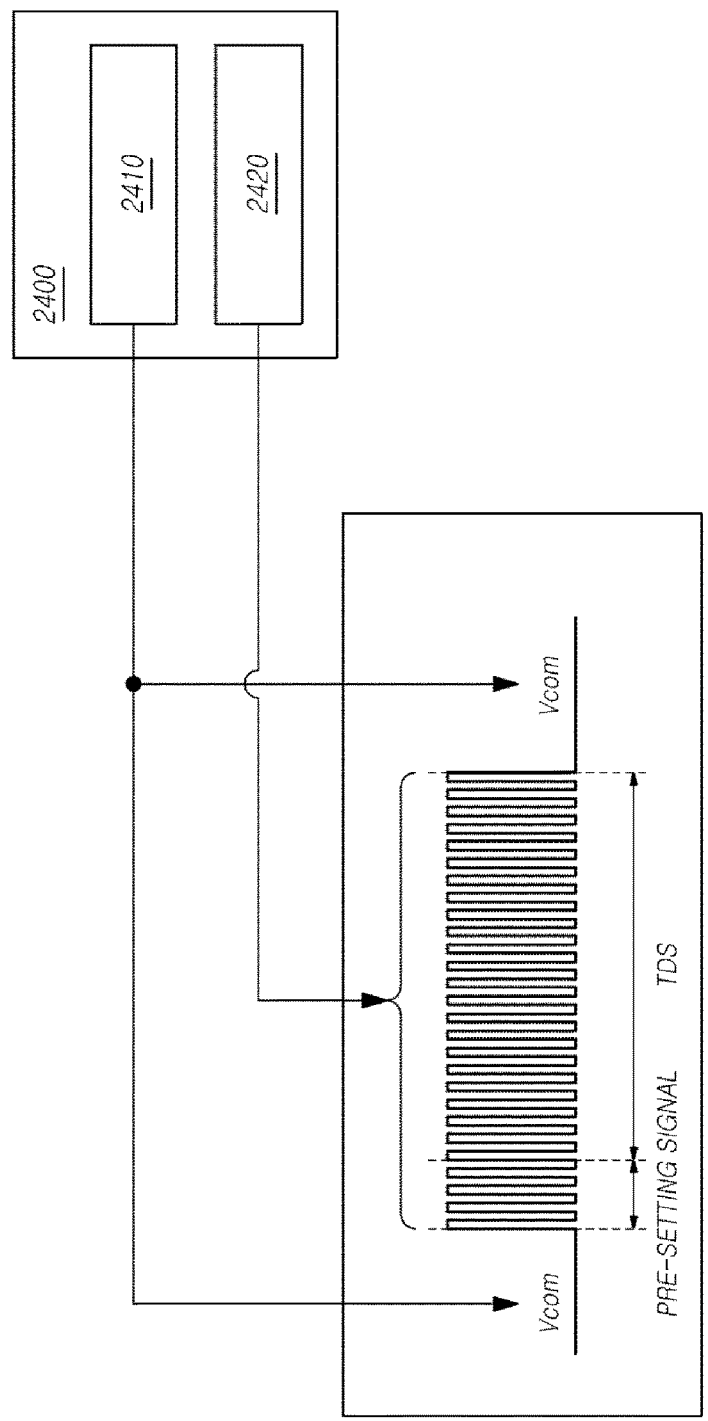
FIG. 24 is a block diagram illustrating a display driver circuit of the touch display device according to the present embodiments.

FIG. 24 is a block diagram illustrating a display driver circuit 2400 of the touch display device 100 according to the present embodiments.

Referring to FIG. 24, the display driver circuit 2400 of the touch display device 100 according to the present embodiments includes a display driving section 2410 and a touch circuit section 2420. During the display mode, the display driving section 2410 outputs a display mode voltage Vcom to the N number of common electrodes CE disposed on the display panel 110. During the touch mode, the touch circuit section 2420 sequentially outputs a touch driving signal TDS to M number of common electrode groups ($2 \leq M \leq N$) into which N number of common electrodes are categorized.

The touch circuit section 2420 can output a pre-setting dummy pulse signal before sequentially outputting the touch driving signal TDS to the M number of common electrode groups.

The display driving section 2410 and the touch circuit section 2420 can operate based on relevant signals received from the power control circuit 420.

The display driver circuit 2400 further includes a switch circuit 320 having at least one multiplexer electrically connected to the display driving section 2410 and the touch circuit section 2420.

The use of the display driver circuit 2400 can provide not only the display function in which the N number of common electrodes are driven as display electrodes, but also the touch sensing function in which the N number of common electrodes are driven as touch electrodes. In addition, a pre-setting dummy pulse signal is output to the corresponding common electrode before the touch driving signal TDS for touch driving is output to the corresponding common electrode. This can consequently prevent the sensing destabilizing phenomenon due to the display-touch crosstalk and the sensing destabilizing phenomenon due to the signal delay difference, thereby improving the accuracy of touch sensing.

Figure 25:
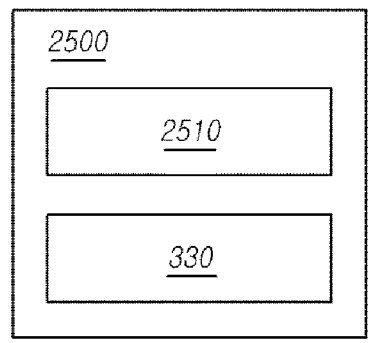
FIG. 25 is a block diagram illustrating another display driver circuit of the touch display device according to the present embodiments.

FIG. 25 is a block diagram illustrating a display driver circuit 2500 of the touch display device 100 according to the present embodiments.

Referring to FIG. 25, the display driver circuit 2500 of the touch display device 100 according to the present embodiments includes a data driver circuit 2510 and the touch sensing signal detection circuit 330. During the display mode, the data driver circuit 2510 outputs data voltages to a plurality of data lines disposed on the display panel 110.

During the touch mode, the touch sensing signal detection circuit 330 sequentially detects a touch sensing signal TSS from M number of common electrode groups (2≤M≤N) into which N number of common electrodes disposed on the display panel 110 are categorized.

The touch sensing signal detection circuit 330 can extract some pulses from among a plurality of pulses of the touch sensing signal TSS.

Here, the extracted pulses may correspond to the real touch driving pulses in FIG. 14 among the plurality of pulses of the touch sensing signal TSS.

The touch sensing signal detection circuit 330 may include the AFE illustrated in FIG. 22. In some cases, the touch sensing signal detection circuit 330 may further include the sensing data generator circuit 340 that can be an ADC.

The use of the display driver circuit 2500 can provide not only the data driving function, but also the touch sensing function when pre-setting driving for sensing stabilization is performed before touch driving. In particular, among a plurality of pulses of the touch sensing signal TSS, only a pulse generated in relation to real touch driving may be extracted and used in touch sensing by removing the pulses generated by pre-setting pulses and reset pulses. This can consequently prevent the sensing destabilizing phenomenon caused by the sensing display touch crosstalk and the sensing destabilizing phenomenon caused by the signal delay difference and also performing accurate touch sensing.

Figure 26:
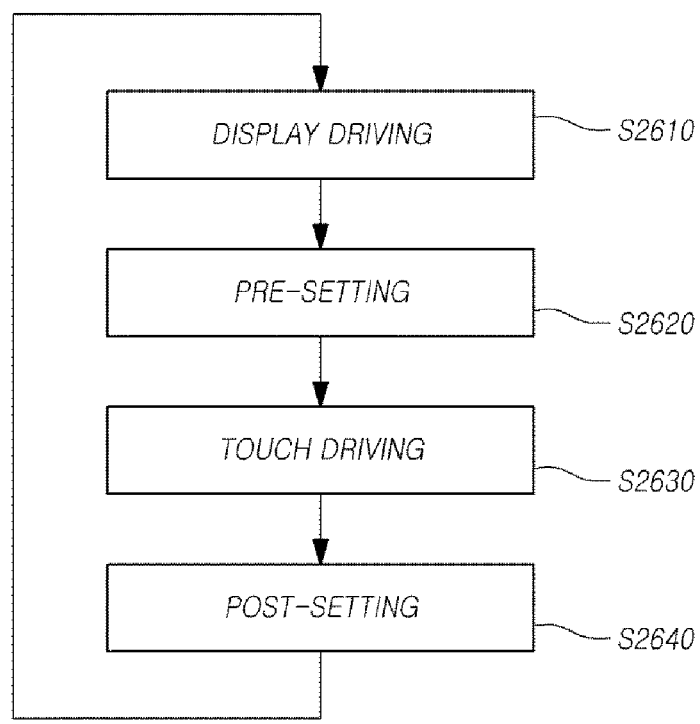
FIG. 26 is a flowchart illustrating a method of driving the touch display device according to the present embodiments.

FIG. 26 is a flowchart illustrating a method of driving the touch display device 100 according to the present embodiments.

Referring to FIG. 26, the method of driving the touch display device 100 according to the present embodiments includes display driving operation S2610 of applying a display mode voltage to N number of common electrodes CE disposed on the display panel 110 in a display mode and touch driving operation S2630 of sequentially applying a touch driving signal TDS to N number of common electrodes in touch mode.

Referring to FIG. 26, the method of driving the touch display device 100 according to the present embodiments further includes pre-setting operation S2620 of applying a pre-setting dummy pulse signal to at least one common electrode among the N number of common electrodes CE before the touch driving operation S2630 of sequentially applying the touch driving signal TDS to the N number of common electrodes.

According to the driving method, the pre-setting dummy pulse signal is applied to at least one common electrode group among M number of common electrode groups (the N number of common electrodes when M=N) before sequentially driving the M number of common electrode groups. When touch driving is performed in earnest, a voltage state required for touch driving and touch sensing may rapidly occur in the common electrode(s) CE to which the pre-setting dummy pulse signal is applied.

That is, as the pre-setting dummy pulse signal is pre-applied to the common electrode CE before the touch driving signal TDS is applied, the display touch crosstalk can be removed or reduced, and the signal delay difference can also be removed or reduced, thereby stabilizing sensing.

In addition, after the touch driving operation S2630, post-setting operation S2640 of applying a post-setting signal to the N number of common electrodes before a display mode voltage is applied may be performed.

When the post-setting operation S2640 is further performed, a display driving preparatory state is preemptively formed by previously applying the post-setting signal before display driving is performed immediately after touch driving is ended, thereby preventing the touch-display crosstalk, i.e. the influence of touch driving and load-free driving performed in the touch mode remaining in the display mode. This can consequently result in display stabilization and improve image quality in the display mode.

According to the present embodiments as set forth above, it is possible to provide the touch circuit 200 or 2300, the display driver circuit 2400 or 2500, the touch display device 100, and the method of driving the same to be able to improve the accuracy of touch sensing by stabilizing touch sensing when display driving is ended and touch driving begins to be performed.

According to the present embodiments, it is possible to provide the touch circuit 200 or 2300, the display driver circuit 2400 or 2500, the touch display device 100, and the method of driving the same to be able to minimize or remove the influence between the display mode and the touch mode when the display mode and the touch mode are time-divided, such that the display function and the touch sensing function can be properly performed.

According to the present embodiments, it is possible to provide the touch circuit 200 or 2300, the display driver circuit 2400 or 2500, the touch display device 100, and the method of driving the same to be able to accurately perform touch driving and touch sensing without the influence of ended display driving when display driving is ended and touch driving begins to be performed, thereby providing an accurate touch sensing result.

According to the present embodiments, it is possible to provide the touch circuit 200 or 2300, the display driver circuit 2400 or 2500, the touch display device 100, and the method of driving the same to be able to accurately perform display driving without the influence of touch driving when touch driving is ended and display driving begins to be performed, thereby improving image quality.

According to the present embodiments, it is possible to provide the touch circuit 200 or 2300, the display driver circuit 2400 or 2500, the touch display device 100, and the method of driving the same to be able to accurately perform touch driving and load free driving as well as resultant touch sensing without the influence of display driving when display driving is ended and both touch driving and load free driving for removing parasitic capacitance begin to be performed.

The foregoing descriptions and the accompanying drawings have been presented in order to explain the certain principles of the present disclosure. A person skilled in the art to which the present disclosure relates can make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended Claims and all of their equivalents fall within the scope of the present disclosure.

What is claimed is:

1. A touch sensitive display device comprising:
a display panel including a plurality of electrodes; and
circuitry to drive the electrodes during at least a display mode and a touch mode, wherein:
during the display mode, the circuitry provides a common voltage to the electrodes;
during the touch mode, the circuitry provides a touch driving signal to at least one first electrode of the electrodes; and
during a pre-setting period after the common voltage is provided to the electrodes and before the touch driving signal is provided to the at least one first electrode, the circuitry provides a pre-setting dummy pulse signal to the at least one first electrode, and the circuitry disregards touch sensing data generated responsive to the pre-setting dummy pulse signal, wherein the pre-setting dummy pulse signal has a same phase as the touch driving signal.

2. The touch sensitive display device of claim 1, further comprising:
a timing controller to generate a synchronization signal having a first state during the touch mode and a second state during the display mode.

3. The touch sensitive display device of claim 2, wherein the pre-setting period is during the touch mode when the synchronization signal is in the first state.

4. The touch sensitive display device of claim 2, wherein the pre-setting period is during the display mode when the synchronization signal is in the second state.

5. The touch sensitive display device of claim 1, wherein during the touch mode:
the circuitry provides the touch driving signal to at least one second electrode of the electrodes after providing the touch driving signal to the at least one first electrode, and
the circuitry does not provide the pre-setting dummy pulse signal to the at least one second electrode.

6. The touch sensitive display device of claim 1, wherein during the touch mode, the circuitry:

provides the pre-setting dummy pulse signal to at least one second electrode of the electrodes after providing the touch driving signal to the at least one first electrode, and
provides the touch driving signal to the at least one second electrode after providing the pre-setting dummy pulse signal to the at least one second electrode.

7. The touch sensitive display device of claim 1, wherein the display panel comprises:
a plurality of data lines; and
a plurality of gate lines,
wherein the circuitry provides a pre-setting load free driving (LFD) signal to at least one of the gate lines or data lines while the pre-setting dummy pulse signal is provided to the at least one first electrode, and
wherein the pre-setting LFD signal has a same phase as the pre-setting dummy pulse signal.

8. The touch sensitive display device of claim 1, wherein during another display mode following the touch mode, the circuitry again provides the common voltage to the electrodes, and
during a post-setting period after the circuitry provides the touch driving signal to the at least one electrode and before the circuitry again provides the common voltage to the electrodes, the circuitry provides a post-setting signal to the electrodes that is same as the common voltage.

9. The touch sensitive display device of claim 1, wherein the pre-setting dummy pulse signal has a same amplitude as the touch driving signal.

10. The touch sensitive display device of claim 1, wherein the pre-setting dummy pulse signal has a greater amplitude than the touch driving signal.

11. The touch sensitive display device of claim 1,
wherein the touch driving signal comprises one or more reset pulses and one or more real touch driving pulses after the one or more reset pulses, and
wherein the circuitry does not sense touch from touch sensing data generated responsive to the reset pulses and senses touch from touch sensing data generated responsive to the one or more real touch driving pulses.

12. A driver circuit for a touch sensitive display panel that includes a plurality of electrodes, the driver circuit comprising:
circuitry to drive the electrodes during at least a display mode and a touch mode, the circuitry to:
during the display mode, provide a common voltage to the electrodes;
during the touch mode, provide a touch driving signal to at least one first electrode of the electrodes; and
during a pre-setting period after the common voltage is provided to the electrodes and before the touch driving signal is provided to the at least one first electrode, provide a pre-setting dummy pulse signal to the at least one first electrode, wherein touch sensing data generated responsive to the pre-setting dummy pulse signal is disregarded, and wherein the pre-setting dummy pulse signal has a same phase as the touch driving signal.

13. The driver circuit of claim 3, wherein the circuitry receives a synchronization signal having a first state during the touch mode and a second state during the display mode.

14. The driver circuit of claim 13, wherein the pre-setting period is during the touch sensing mode when the synchronization signal is in the first state.

15. The driver circuit of claim 13, wherein the pre-setting period is during the display mode when the synchronization signal is in the second state.

16. The driver circuit of claim 12, wherein during the touch sensing mode:
the circuitry provides the touch driving signal to at least one second electrode of the electrodes after providing the touch driving signal to the at least one first electrode, and
the circuitry does not provide the pre-setting dummy pulse signal to the at least one second electrode.

17. The driver circuit of claim 12, wherein during the touch sensing mode, the circuitry:
provides the pre-setting dummy pulse signal to at least one second electrode of the electrodes after providing the touch driving signal to the at least one first electrode, and
provides the touch driving signal to the at least one second electrode after providing the pre-setting dummy pulse signal to the at least one second electrode.

18. The driver circuit of claim 12,
wherein the circuitry provides a pre-setting load free driving (LFD) signal to at least one of gate lines or data lines of the display panel while the pre-setting dummy pulse signal is provided to the at least one first electrode, and
wherein the pre-setting LFD signal has a same phase as the pre-setting dummy pulse signal.

19. The driver circuit of claim 12, wherein
during another display mode following the touch sensing mode, the circuitry again provides the common voltage to the electrodes, and
during a post-setting period after the circuitry provides the touch driving signal to the at least one electrode and before the circuitry again provides the common voltage to the electrodes, the circuitry provides a post-setting signal to the electrodes that is same as the common voltage.

20. The driver circuit of claim 12, wherein the pre-setting dummy pulse signal has a same amplitude as the touch driving signal.

21. The driver circuit of claim 12, wherein the pre-setting dummy pulse signal has a greater amplitude than the touch driving signal.

22. The driver circuit of claim 12,
wherein the touch driving signal comprises one or more reset pulses and one or more real touch driving pulses after the one or more reset pulses, and
wherein touch is not sensed from touch sensing data generated responsive to the reset pulses, touch is sensed from touch sensing data generated responsive to the one or more real touch driving pulses.

23. A method for operating a touch sensitive display device that comprises a display panel including a plurality of electrodes, the method comprising:
during a display mode, providing a common voltage to the electrodes;
during a touch sensing mode, providing a touch driving signal to at least one first electrode of the electrodes; and
during a pre-setting period after the common voltage is provided to the electrodes and before the touch driving signal is provided to the at least one first electrode, providing a pre-setting dummy pulse signal to the at least one first electrode, and disregarding touch sensing data generated responsive to the pre-setting dummy pulse signal, wherein the pre-setting dummy pulse signal has a same phase as the touch driving signal.

24. The method of claim 23, further comprising, during the touch mode:
providing the touch driving signal to at least one second electrode of the electrodes after providing the touch driving signal to the at least one first electrode, and
wherein the pre-setting dummy pulse signal is not provided to the at least one second electrode during the touch mode.

25. The method of claim 1, further comprising, during the touch mode:
providing the pre-setting dummy pulse signal to at least one second electrode of the electrodes after providing the touch driving signal to the at least one first electrode, and
providing the touch driving signal to the at least one second electrode after providing the pre-setting dummy pulse signal to the at least one second electrode.

26. The method of claim 23, further comprising:
providing a pre-setting load free driving (LFD) signal to at least one of the gate lines or data lines while the pre-setting dummy pulse signal is provided to the at least one first electrode, and
wherein the pre-setting LFD signal has a same phase as the pre-setting dummy pulse signal.

27. The method of claim 23, further comprising:
during another display mode following the touch mode, again providing the common voltage to the electrodes, and
during a post-setting period after the touch driving signal is provided to the at least one electrode and before the common voltage is again provided to the electrodes, providing a post-setting signal to the electrodes that is same as the common voltage.

28. The method of claim 23, wherein the touch driving signal comprises one or more reset pulses and one or more real touch driving pulses after the one or more reset pulses, and the method further comprises:
not sensing touch from touch sensing data generated responsive to the reset pulses, and
sensing touch from touch sensing data generated responsive to the one or more real touch driving pulses.

* * * * *